(12) United States Patent
Reytier et al.

(10) Patent No.: US 11,398,640 B2
(45) Date of Patent: Jul. 26, 2022

(54) METHODS FOR CO-ELECTROLYSIS OF WATER AND $CO_2$ (SOEC) OR FOR HIGH-TEMPERATURE ELECTRICITY PRODUCTION (SOFC) OPTIONALLY PROMOTING CATALYTIC REACTIONS INSIDE THE $H_2$ ELECTRODE

(71) Applicant: COMMISSARIAT A L'ENERGIE ATOMIQUE ET AUX ENERGIES ALTERNATIVES, Paris (FR)

(72) Inventors: Magali Reytier, Villard de Lans (FR); Guilhem Roux, Saint-Egreve (FR); Jerome Laurencin, Sassenage (FR); Michel Planque, Seyssins (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 192 days.

(21) Appl. No.: 16/335,524

(22) PCT Filed: Sep. 15, 2017

(86) PCT No.: PCT/EP2017/073301
§ 371 (c)(1),
(2) Date: Mar. 21, 2019

(87) PCT Pub. No.: WO2018/054781
PCT Pub. Date: Mar. 29, 2018

(65) Prior Publication Data
US 2019/0348699 A1 Nov. 14, 2019

(30) Foreign Application Priority Data
Sep. 22, 2016 (FR) ...................... 16 58908

(51) Int. Cl.
*H01M 8/18* (2006.01)
*H01M 8/00* (2016.01)
(Continued)

(52) U.S. Cl.
CPC ............... *H01M 8/186* (2013.01); *C25B 1/04* (2013.01); *C25B 3/25* (2021.01); *C25B 9/65* (2021.01);
(Continued)

(58) Field of Classification Search
CPC ............. H01M 8/0273; H01M 8/1231; H01M 8/2457; H01M 8/1213; H01M 8/2425;
(Continued)

(56) References Cited

U.S. PATENT DOCUMENTS 6,689,499 B2    2/2004  Gillett et al.
7,923,165 B2 *  4/2011  Smotkin ............. H01M 8/1213
                                                    429/491
(Continued)

FOREIGN PATENT DOCUMENTS

JP    64-63271 A      3/1989
JP    2006-114387 A   4/2006
(Continued)

OTHER PUBLICATIONS

French Preliminary Search Report dated Apr. 12, 2017, in Patent Application No. 1658908, 10 pages (with English translation of categories of cited documents).
(Continued)

*Primary Examiner* — Christian Roldan
(74) *Attorney, Agent, or Firm* — Oblon, McClelland, Maier & Neustadt, L.L.P.

(57) ABSTRACT

The invention essentially consists of proposing a novel reactor or fuel cell architecture having an active section of the catalytic material for methanation or reforming reaction
(Continued)

integrated into the electrode which varies with the composition of the gases, as they are distributed in accordance with the electrochemistry on said electrode.

7 Claims, 7 Drawing Sheets

(51) Int. Cl.
*H01M 8/12* (2016.01)
*H01M 8/2432* (2016.01)
*H01M 8/0247* (2016.01)
*H01M 8/0273* (2016.01)
*H01M 8/0282* (2016.01)
*H01M 8/04089* (2016.01)
*C25B 1/04* (2021.01)
*C25B 3/25* (2021.01)
*C25B 9/65* (2021.01)
*C25B 9/73* (2021.01)
*C25B 9/75* (2021.01)
*C25B 11/036* (2021.01)

(52) U.S. Cl.
CPC ............... *C25B 9/73* (2021.01); *C25B 9/75* (2021.01); *C25B 11/036* (2021.01); *H01M 8/006* (2013.01); *H01M 8/0247* (2013.01); *H01M 8/0273* (2013.01); *H01M 8/0282* (2013.01); *H01M 8/04089* (2013.01); *H01M 8/2432* (2016.02); *H01M 2008/1293* (2013.01)

(58) Field of Classification Search
CPC ........ H01M 2008/1293; H01M 8/0286; C25B 1/04; C25B 9/65; C25B 9/70; C25B 9/73; C25B 15/08; C25B 9/23; C25B 1/00; C25B 9/66; Y02E 60/50; Y02E 60/36; Y02P 20/129
USPC ........................................................ 429/423
See application file for complete search history.

(56) References Cited

U.S. PATENT DOCUMENTS

| | | | |
|---|---|---|---|
| 2002/0081471 A1 | 6/2002 | Keegan et al. | |
| 2007/0116998 A1* | 5/2007 | Kuznecov | H01M 8/0202 429/482 |
| 2015/0329979 A1* | 11/2015 | Reytier | C25B 1/00 205/360 |
| 2015/0333342 A1* | 11/2015 | Planque | H01M 8/026 429/457 |
| 2016/0355932 A1* | 12/2016 | Reytier | C25B 11/00 |

FOREIGN PATENT DOCUMENTS

| | | |
|---|---|---|
| JP | 2007-265939 A | 10/2007 |
| JP | 2009-26524 A | 2/2009 |
| WO | WO 2011/110674 A1 | 9/2011 |
| WO | WO 2016/097261 A1 | 6/2016 |

OTHER PUBLICATIONS

International Search Report dated Oct. 27, 2017 in PCT/EP2017/073301, 3 pages.
Ocampo, F. et al. "Methanation of carbon dioxide over nickel-based $Ce_{0.72}Zr_{0.28}O_2$ mixed oxide catalysts prepared by sol-gel method" Journal of Applied Catalysis A: General 369, 2009, pp. 90-96.

* cited by examiner (prior art)

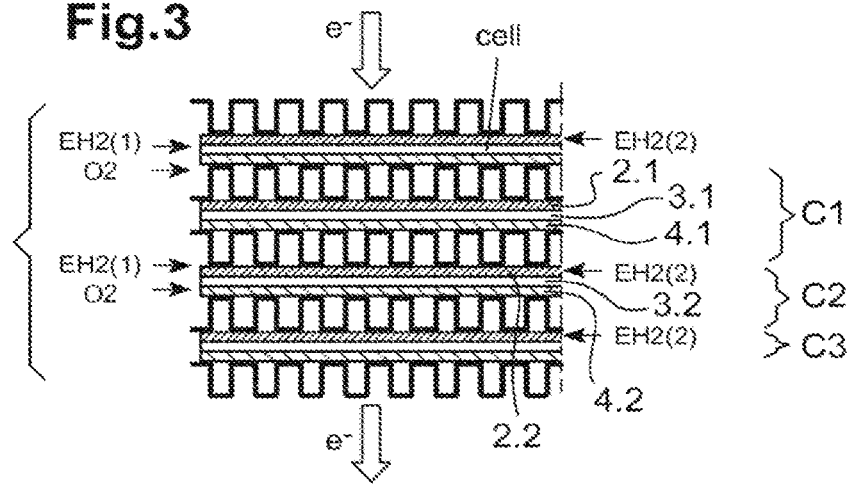
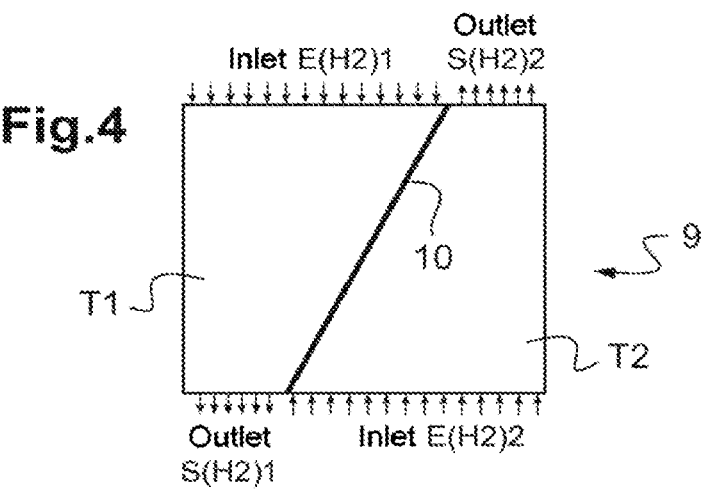
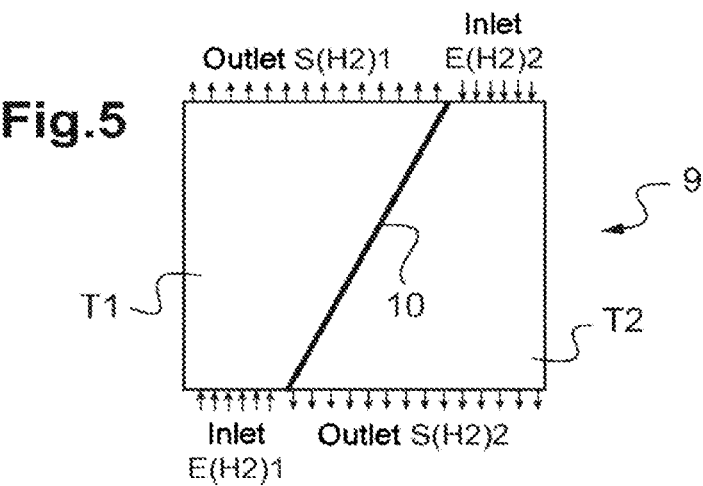

METHODS FOR CO-ELECTROLYSIS OF WATER AND CO₂ (SOEC) OR FOR HIGH-TEMPERATURE ELECTRICITY PRODUCTION (SOFC) OPTIONALLY PROMOTING CATALYTIC REACTIONS INSIDE THE H₂ ELECTRODE

TECHNICAL FIELD

The present invention relates to the field of solid oxide fuel cells (SOFC) and that of high-temperature electrolysis of water (HTE, or else HTSE, acronym for High Temperature Steam Electrolysis) also using solid oxides (SOEC, acronym for Solid Oxide Electrolysis Cell).

The invention more particularly relates to novel methods for operating a reactor for high-temperature co-electrolysis (HTE) of SOEC type from carbon dioxide $CO_2$ and steam $H_2O$ to produce a synthesis gas (mixture of CO and $H_2$), or an SOFC-type fuel cell, containing a stack of individual electrochemical cells containing solid oxides.

It aims to propose a solution for promoting or not promoting the methanation reaction within an HTE reactor or the reaction for internal reforming of methane within an SOFC fuel cell.

Although it is described mainly with reference to the application of high-temperature co-electrolysis of carbon dioxide $CO_2$ and water $H_2O$, the invention also applies to an SOFC fuel cell supplied with $H_2$ and/or with methane $CH_4$ as fuel and with air or oxygen $O_2$ as oxidizer.

PRIOR ART

The electrolysis of water is an electrochemical reaction that decomposes water into gaseous dioxygen and dihydrogen by means of an electrical current according to the reaction:

$$H_2O \rightarrow H_2 + \tfrac{1}{2}O_2.$$

It is advantageous to carry out the electrolysis of water at high temperature, typically between 600 and 950° C., as some of the energy required for the reaction can be supplied by heat, which is less expensive than electricity, and carrying out the reaction is more efficient at high temperature. For implementing high-temperature electrolysis, use of an electrolyzer of the SOEC type (acronym for "solid oxide electrolysis cell") is known, said electrolyzer consisting of a stack of individual units, each comprising a solid oxide electrolysis cell, consisting of three layers, anode/electrolyte/cathode, superposed on one another, and of interconnection plates, for example made of metal alloys, also referred to as bipolar plates, or interconnectors. The function of the interconnectors is to provide both passage of the electrical current and circulation of the gases in the vicinity of each cell (injected steam, hydrogen and oxygen extracted in an HTE electrolyzer; air and hydrogen and/or methane injected and water extracted in an SOFC cell) and to separate the anode and cathode compartments, which are the compartments for circulation of the gases on the anode side and the cathode side of the cells, respectively. For carrying out high-temperature electrolysis HTE of steam, steam $H_2O$ is injected into the cathode compartment. Under the action of the current applied to the cell, dissociation of the water molecules in the form of steam takes place at the interface between the hydrogen electrode (cathode) and the electrolyte: this dissociation produces dihydrogen gas $H_2$ and oxygen ions. The dihydrogen is collected and discharged at the outlet of the hydrogen compartment. The oxygen $O^{2-}$ ions migrate through the electrolyte and recombine into dioxygen at the interface between the electrolyte and the oxygen electrode (anode).

As shown schematically in FIG. 1, each individual electrolysis cell 1 is formed from a cathode 2 and an anode 4, placed on either side of a solid electrolyte 3. The two electrodes (cathode and anode) 2, 4 are conductors made of porous material, and the electrolyte 3 is gastight, an electron insulator and an ion conductor. The electrolyte may in particular be an anion conductor, more precisely an anion conductor of the $O^{2-}$ ions and the electrolyzer is then referred to as an anion electrolyzer.

The electrochemical reactions take place at the interface between each of the electron conductors and the ion conductor.

At the cathode 2, the half-reaction is as follows:

$$2H_2O + 4e^- \rightarrow 2H_2 + 2O^{2-}.$$

At the anode 4, the half-reaction is as follows:

$$2O^{2-} \rightarrow O_2 + 4e^-.$$

The electrolyte 3 inserted between the two electrodes 2, 4 is the site of migration of the $O^{2-}$ ions under the effect of the electrical field created by the difference in potential imposed between the anode 4 and the cathode 2.

As illustrated in brackets in FIG. 1, the steam at the cathode inlet may be accompanied by hydrogen $H_2$ and the hydrogen produced and recovered at the outlet may be accompanied by steam. Likewise, as illustrated in dotted lines, a draining gas, such as air, may additionally be injected at the inlet in order to remove the oxygen produced. The injection of a draining gas has the additional role of acting as thermal regulator.

An individual electrolysis reactor consists of an individual cell as described above, with a cathode 2, an electrolyte 3 and an anode 4, and of two monopolar connectors which provide the electrical, hydraulic and thermal distribution functions.

In order to increase the flow rates of hydrogen and oxygen produced, it is known to stack several individual electrolysis cells on top of one another, separating them with interconnection devices, usually known as bipolar interconnection plates or interconnectors. The assembly is positioned between two end interconnection plates which bear the electrical supplies and gas supplies of the electrolyzer (electrolysis reactor).

An electrolysis reactor or high-temperature water electrolyzer (HTE) thus comprises at least one, generally a plurality of, electrolysis cells stacked on top of one another, each individual cell being formed of an electrolyte, of a cathode and of an anode, the electrolyte being inserted between the anode and the cathode.

The fluidic and electrical interconnection devices, which are electron conductors, are in electrical contact with the electrodes and generally provide the functions of introducing and collecting electrical current and delimit one or more compartments for the circulation of the gases. More precisely, an interconnector provides electrical contact via one face thereof with the cathode of one cell, and via the other face thereof with the anode of the adjacent cell.

Thus, a "cathode" compartment has the role of distributing the electrical current and steam and also of recovering the hydrogen produced at the cathode in contact.

An "anode" compartment has the role of distributing the electrical current and also of recovering the oxygen produced at the anode in contact, optionally with the help of a draining gas.

FIG. 2 represents an exploded view of individual units of a high-temperature steam electrolyzer according to the state of the art. This HTE co-electrolyzer comprises a plurality of individual co-electrolysis cells C1, C2, . . . , of solid oxide (SOEC) type, stacked alternately with interconnectors 5. Each cell C1, C2, . . . consists of a cathode 2.1, 2.2, . . . and an anode 4.1, 4.2, . . . between which an electrolyte 3.1, 3.2, . . . is arranged. The assembly of the co-electrolysis cells is generally supplied in series by the electrical current and in parallel by the gases.

The interconnector 5 is a component made of metal alloy, which provides the separation between the cathode compartment 50 and anode compartment 51, which are defined by the volumes between the interconnector 5 and the adjacent cathode 2.1 and between the interconnector 5 and the adjacent anode 4.2, respectively. It also provides distribution of the gases to the cells. Injection of a mixture of steam and of carbon dioxide into each individual unit takes place in the cathode compartment 50. Collection of the hydrogen and the carbon monoxide produced and of the residual steam at the cathode 2.1, 2.2, . . . takes place in the cathode compartment 50 downstream of the cell C1, C2, . . . after dissociation of the steam and the carbon dioxide by the latter. Collection of the oxygen produced at the anode 4.2 takes place in the anode compartment 51 downstream of the cell C1, C2, . . . after dissociation of the steam and the carbon dioxide by the latter.

The interconnector 5 provides the passage of the current between the cells C1 and C2 by direct contact with the adjacent electrodes, that is to say between the anode 4.2 and the cathode 2.1.

In a solid oxide fuel cell SOFC according to the state of the art, the cells C1, C2, . . . , and interconnectors 5 used are the same components, but the operation is the reverse of that of an HTE co-electrolyzer such as has just been explained, with a reversed current direction, with air which supplies what are now cathode compartments 51 and hydrogen or methane as fuel which supplies what are now anode compartments 50.

Satisfactory operation of an HTE (co-)electrolyzer or of an SOFC fuel cell requires, inter alia, the following essential functions:

A/ good electrical insulation between two adjacent interconnectors in the stack, otherwise the individual electrochemical cell inserted between the two interconnectors will be short-circuited, B/ good leaktightness between the two separate compartments, i.e. anode and cathode compartments, otherwise the gases produced will recombine, resulting in a fall in yield and in particular in the appearance of hot spots which damage the stack, C/ good distribution of the gases both at the inlet and on recovery of the gases produced, otherwise there will be a loss of yield, nonuniformity of pressure and nonuniformity of temperature within the different individual cells, or even unacceptable deterioration of the cells.

Moreover, the operating point retained for the electrolysis reactor or the SOFC cell also sets the thermal conditions in the stack. Indeed, for electrolyses carried out at high temperature, the energy ΔH required for dissociation of the inlet molecule ($H_2O$ or $CO_2$) may be provided in electrical and/or heat form. The thermal energy provided Q is then defined as a function of the voltage U at the terminals of each electrolysis cell by the relationship:

$$Q = \frac{1}{2F}\Delta H - U \cdot I,$$

in which U is the electrical voltage, I is the electric current and F is the Faraday constant.

Thus, three operating regimes are defined for the electrolysis or the co-electrolysis, corresponding to three different thermal modes for the stack of cells:

the "autothermal" mode in which the imposed voltage $U_{imp}$ is equal to $\Delta H/2F$. The heat consumed by the dissociation reaction is completely compensated for by the various electrical resistances of the electrolyzer (irreversibilities). The electrolyzer does not require any particular thermal management, while at the same time remaining temperature-stable.

the "endothermic" mode in which the imposed voltage $U_{imp}$ is less than $\Delta H/2F$. The electrolyzer consumes more heat than the electrical losses therein. This required heat must thus be supplied thereto by another means, otherwise its temperature will drop irreparably.

the "exothermic" mode in which the imposed voltage $U_{imp}$ is greater than $\Delta H/2F$. The electrolysis then consumes less heat than the electrical losses via the Joule effect. This release of heat within the electrolyzer must then be discharged by another means, otherwise its temperature will increase unacceptably.

The operation of a cell supplied with methane $CH_4$, for its part, requires some precautions. Indeed, the thermal management of this type of cell is a compromise. On the one hand, the internal reforming reaction of the electrode supplied with $CH_4$ and with steam, according to the equation $CH_4 + H_2O \rightarrow 3H_2 + CO$, catalysed by cermet, in general made of nickel-zirconia since nickel has the advantage of being a very good catalyst of the above reforming reaction, is highly endothermic, whereas the reaction of oxidation of hydrogen within the cell, with the aim of producing electricity, is highly exothermic.

Thus, cell operation may also vary from an endothermic mode to an exothermic mode depending on the ratio between the internal reforming reaction and the current density. Without particular precautions, this requires managing large thermal gradients within the stack, between the inlet and the outlet of the gases, these large thermal gradients possibly being unacceptable since they induce high mechanical stresses. Moreover, operation of an SOFC cell supplied solely with pure hydrogen rapidly leads to heating of the stack, limiting the accessible power and the yield, if high flow rates are used for the cooling.

In addition, the transport, storage and use of the hydrogen or of the synthesis gas produced require minimal pressure. Rather than compressing the gas produced, which constitutes a significant cost, especially for hydrogen, this type of electrolysis by SOEC may be performed directly from pressurized steam, the water then being compressed in the liquid state.

The internal operation of an SOFC cell or of an HTE reactor under pressure, typically a few bars to a few tens of bars, typically 30 bar, thus requires a solution to prevent the loss of the leaktightness by the seals.

A solution that consists in placing the HTE stack reactor or SOFC cell in a leaktight enclosure that itself is pressurized is already known.

Mention will be made here of patents or patent applications WO2011/110674A1, US2002/0081471 and U.S. Pat. No. 6,689,499 B2, which disclose this type of solution. This known solution has the advantage of making it possible to apply the same pressure inside and outside the stack. This therefore allows operation at a high pressure, of a few bars to a few tens of bars, without mechanically stressing the glass or glass-ceramic seals.

With this solution of HTE reactor with operation under pressure, it is possible to carry out the electrolysis of steam $H_2O$ to produce hydrogen on the one hand and oxygen on the other, which may be utilized independently. This same reactor may also make it possible to carry out the co-electrolysis of an $H_2O+CO_2$ mixture to form syngas, a mixture of $H_2+CO$ in proportions that are dependent on the targeted fuel.

In other words, it is possible and advantageous to envisage the production of a synthesis fuel gas by electrolysis of steam $H_2O$ to produce hydrogen $H_2$ and/or the co-electrolysis of $H_2O+CO_2$ at high temperature within a reactor containing a stack of solid oxide cells in a pressurized chamber.

The electrolysis of steam (I) and co-electrolysis of $H_2O+CO_2$ (II) reactions proceed according to the following equations:

Electrolysis of steam: $H_2O \rightarrow H_2 + \tfrac{1}{2}O_2$     (I)

Co-electrolysis: $CO_2 + H_2O \rightarrow CO + H_2 + O_2$     (II).

Thus, the electrolysis of steam $H_2O$ enables production of the fuel gas by injection of a mixture of hydrogen $H_2$ produced according to the electrolysis (I) and of carbon dioxide $CO_2$ in a catalyst external to the electrolyzer.

The co-electrolysis of $H_2O+CO_2$, on the other hand, enables production of the fuel gas from the synthesis gas ($H_2+CO$) produced according to the co-electrolysis (II).

The fuel gas produced in this way may be a hydrocarbon, and especially methane, the main component of natural gas.

Different methods for obtaining a fuel gas by heterogeneous catalysis, either directly from a mixture of $H_2$ and carbon dioxide $CO_2$, or indirectly from a synthesis gas ($H_2+CO$), have already been studied.

In particular, the hydrogenation of $CO_2$ to give methane is an industrial process which has been studied at every energy crisis, either to produce synthetic methane from pure $CO_2$ and $H_2$, or in coal gasification plants with more complex gases and conditions (Fischer-Tropsch process).

Each synthesis gas intended to produce a fuel requires a given $H_2/CO$ ratio depending on the targeted fuel.

Table 1 below thus illustrates the necessary ratios as a function of methods for synthesizing different fuels:

TABLE 1

| SYNTHESIS METHOD | FUEL PRODUCT OBTAINED | CO-ELECTROLYSIS $H_2/CO$ RATIO REQUIRED | STEAM $H_2O$ ELECTROLYSIS $CO_2/H_2$ RATIO REQUIRED |
|---|---|---|---|
| Synthesis of methane | Natural gas | 1/3 | 1/4 |
| Synthesis of methanol | Methanol | 1/2 | 1/3 |
| Synthesis of dimethyl ether (DME) | DME | 1/1 | 1/2 |
| Fischer-Tropsch synthesis | Diesel | 1/2 | 1/3 |

For the methanation process, two routes are possible and have been more or less extensively studied in the prior art.

The first route is that of a single reaction according to the following equation:

$CO_2 + 4H_2 \rightarrow CH_4 + 2H_2O$

The second route is that of a two-step reaction according to the following equations:

$CO_2 + H2 \rightarrow CO + H_2O$ $CO + 3H2 \rightarrow CH_4 + H_2O$

As demonstrated by the authors of the publication [1] (see especially FIGS. 3 and 4), methanation reactions are promoted at high pressure and at low temperature according to Le Chatelier's law. Specifically, the thermodynamic calculations indicated in [1] indicate a theoretical conversion of 100% of $CO_2$ into $CH_4$ at less than 150° C. as opposed to 83% at 400° C. However, it is also indicated that a minimum temperature and an optimum gas rate is to be adjusted in order to ensure sufficient kinetics.

The catalysts used for methanation are generally based on nickel supported on a zirconium oxide ($ZrO_2$) or based on nickel (Ni) supported on an aluminum oxide ($Al_2O_3$).

An electrode commonly used in HTE (co-)electrolysis reactors or SOFC fuel cells is based on nickel, such as a cermet of nickel and yttriated zirconia, denoted Ni—YSZ. Nickel especially has the advantage of also being a very good catalyst of the reforming of methane and/or of the formation thereof by hydrogenation of $CO_2$ and CO.

These publications therefore allowed the inventors to conclude that it was possible to envisage directly producing methane within a co-electrolysis reactor itself, as a function of the temperature and pressure levels and gas flow rate.

While this is the case, these methanation reactions are exothermic. Thus, just like for the reforming reaction of an SOFC cell supplied with methane $CH_4$, the heat balance of a pressurized co-electrolysis reactor used to carry out a methanation must take into account the exothermicity of this reaction.

Thus, the electrochemical reactions required for the operation of this type of stack in a (co-)electrolysis reactor or SOFC fuel cell may be carried out under varied electrical, thermal and catalytic conditions, each with their own advantages and disadvantages.

In particular, in the endothermic mode for electrolysis, less electricity is consumed but less hydrogen is produced, and heat must be supplied to the stack. The advantage of this point of operation lies in the availability of an inexpensive heat source. Everything thus depends on the nature and the temperature of this heat source and on the design of the interconnector making it possible to best utilize this heat.

In contrast, the exothermic mode for the electrolysis and for the cell leads to significant production either of the gases formed or of electricity, but the stack must be cooled either by the gases, which may be difficult to perform and energetically expensive, or by the catalytic reactions involving entering species or species formed by the reactions.

A significant constraint is managing as well as possible these thermal operating regimes of a fuel cell (SOFC) or of an electrolyzer (HTE).

In addition, regardless of the design of interconnector adopted to date in a reactor containing a solid oxide cell stack that may operate under pressure either as (co-) electrolysis reactor or as SOFC fuel cell, it is not possible to promote or not promote, as desired, catalytic reactions within the reactor without degrading the electrochemical operation, due to the fact that the catalytic and electrochemical areas are the same and correspond to the area of the cermet.

There is therefore a need to improve electrolysis or co-electrolysis reactors and SOFC fuel cells containing a stack of solid oxide cells operating at high temperature, especially in order to be able to promote or not promote, as desired, the catalytic reactions that are liable to occur within them, more particularly the methanation reaction or the reaction for reforming methane, without impacting on the electrochemical operation.

One aim of the invention is to at least partially meet this need.

SUMMARY OF THE INVENTION

To this end, the invention relates, in a first alternative, to a method for the co-electrolysis of steam $H_2O$ and of carbon dioxide $CO_2$, and where appropriate methanation, implemented in a reactor comprising a stack of individual electrolysis cells of solid oxide type, with a rectangular or square area, each formed of a cathode comprising material(s) for catalyzing a methanation reaction, of an anode and of an electrolyte inserted between the cathode and the anode, a plurality of electrical and fluid interconnectors each arranged between two adjacent individual cells with one face thereof in electrical contact with the anode of one of the two individual cells and the other face thereof in electrical contact with the cathode of the other of the two individual cells, and a plurality of electrical contact and gas distribution elements, each arranged between a cathode and an interconnector.

In the method according to the invention:
a first zone and a second zone of each interconnector are supplied independently with a mixture of steam $H_2O$ and of carbon dioxide $CO_2$ (EH2(1) and EH2(2)) and it is distributed to the cathode of each individual cell, then the synthesis gas produced (mixture of carbon monoxide CO and hydrogen $H_2$) and where appropriate the additional mixture of methane $CH_4$ and of steam $H_2O$ produced by methanation are recovered within the cathode itself, in a third zone and a fourth zone of each interconnector (SH2(1) and SH2(2)) in fluid communication respectively with the first zone and the second zone; each electrical contact and gas distribution element integrating a sealing bead forming a gas distribution barrier separating a first gas flow sector (T1) comprising the first and third zones from a second gas flow sector (T2) comprising the second and fourth zones, the first and second gas flow sectors being adjoined by the barrier, forming an area substantially equal to that of each cell; the first to fourth zones being dimensioned, and the gas circulation barrier being arranged, such that the flow section of the gases increases or decreases between the first and third zones within the first gas flow sector and the flow section of the gases also increases or decreases between the second and fourth zones within the second gas flow sector;
the first and second zones of each interconnector are supplied such that the circulation to each cathode in the first gas flow sector (T1) is in counterflow to the circulation in the second gas flow sector (T2).

According to one advantageous embodiment, the gas flow sectors are of trapezoidal general form.

It is specified here that the increasing, in particular trapezoidal, form of the gas flow sectors is of course to be considered viewed from above the stack, and that the area of the cell is that area which is active considered viewed from above.

According to one variant, supply is carried out via the largest base of the first and second trapezoidal gas flow sectors defined respectively by the first and the third zones, in order to minimize the methanation reaction compared to the co-electrolysis reaction within the stack, the catalytic area decreasing along the path of the gases produced for the same electrochemical area.

Alternatively, supply is carried out via the smallest base of the first and second trapezoidal gas flow sectors defined respectively by the first and the third zones, in order to maximize the methanation reaction compared to the co-electrolysis reaction within the stack, the catalytic area increasing along the path of the gases produced for the same electrochemical area. This makes it possible to envisage the in situ production of at least part of the water required for the co-electrolysis by this methanation reaction rather than by vaporization.

Advantageously, the length ratio between small and large bases of the trapezoidal gas flow sectors is determined beforehand in order to promote or not promote the methanation reaction compared to the co-electrolysis reaction within the stack.

According to one advantageous embodiment, a fifth zone of each interconnector (E(O2)) is supplied with draining gas, such as air, and it is distributed to the anode of each cell, then the oxygen $O_2$ produced and, where appropriate, the draining gas are recovered in a sixth zone of each interconnector (S(O2)), so as to have a supply of draining gas and a recovery of oxygen produced that are common to the first and second trapezoidal gas flow sectors.

Advantageously, the co-electrolysis is carried out at least in part with the steam $H_2O$ produced by methanation.

According to a second alternative, the invention also relates to a method for producing electricity at high temperature, implemented in a solid oxide fuel cell (SOFC) comprising a stack of individual electrochemical cells of SOFC type, each formed of a cathode, of an anode comprising material(s) for catalyzing a reaction for reforming methane ($CH_4$), and of an electrolyte inserted between the cathode and the anode, a plurality of electrical and fluid interconnectors each arranged between two adjacent individual cells with one face thereof in electrical contact with the anode of one of the two individual cells and the other face thereof in electrical contact with the cathode of the other of the two individual cells, and a plurality of electrical contact and gas distribution elements, each arranged between an anode and an interconnector.

In method according to the invention:
a first zone and a second zone of each interconnector are supplied independently with a fuel and it is distributed to the anode of each individual cell, then the surplus fuel ($CH_4$ and where appropriate mixture of carbon monoxide CO and hydrogen $H_2$ following reforming) and the water produced are recovered, in a third zone and a fourth zone of each interconnector in fluid communication respectively with the first zone and the second zone; each electrical contact and gas distribution element integrating a sealing bead forming a gas distribution barrier separating a first gas flow sector (T1) comprising the first and third zones from a second gas flow sector (T2) comprising the second and fourth zones, the first and second gas flow sectors being adjoined by the barrier, forming an area substantially equal to that of each cell; the first to fourth zones being dimensioned, and the gas circulation barrier being arranged, such that the flow section of the gases increases or decreases between the first and third zones within the first gas flow sector and the flow section of the gases also increases or decreases between the second and fourth zones within the second gas flow sector;

the first and second zones of each interconnector are supplied such that the circulation to each anode in the first gas flow sector is in counterflow to the circulation in the second gas flow sector.

The gas sealing barrier separates the electrical contact element into two distinct gas flow sectors, and also the porous $H_2$ electrode. It may be a glass or glass-ceramic bead or a solder which advantageously infiltrates the electrode when it is put in place. Thus, the function of the barrier is to obstruct the passage of the gases without there being a need for perfect leaktightness. It is particularly advantageous to produce the barrier according to the invention from a glass-ceramic bead. A glass-ceramic at room temperature is in the form of a paste which is easy to cause to penetrate a porous metallic substrate such as a nickel screen, and also the porous $H_2$ electrode. A rise in temperature of the seal to temperatures between 850 and 1000° C. will make it possible to melt the glass-ceramic which will fall into place while hot and conform to the shape of the porous substrate of the electrical contact element by filling in porosities, such as the mesh of the nickel screen, according to the continuous barrier profile that it is desired to give thereto. Once in place, the barrier is crystallized at the operating temperatures of the reactor or the fuel cell, typically between 600 and 850° C., and thus prevents any passage of the injected gases ($H_2O$, $H_2$, CO, $CO_2$, $CH_4$, etc.) from one gas flow sector T1 to the other T2 which adjoins it.

According to one variant, supply is carried out via the largest base of the first and second trapezoidal gas flow sectors delimited respectively by the first and the third zone, in order to maximize the reforming reaction compared to the production of water within the stack by oxidation of the hydrogen.

Alternatively, supply is carried out via the smallest base of the first and second trapezoidal gas flow sectors delimited respectively by the first and the third zone, in order to minimize the reforming reaction compared to the production of water within the stack, which makes it possible to envisage the in situ production of at least part of the water required for the reforming.

Advantageously, the length ratio between small and large bases of the trapezoidal gas flow sectors is determined beforehand in order to promote or not promote the reforming reaction compared to the reaction for producing water by oxidation of the hydrogen within the cell.

According to one advantageous embodiment, a fifth zone of each interconnector is supplied with oxidizer such as air, and it is distributed to the cathode of each cell, then the surplus oxidizer remaining is recovered in a sixth zone of each interconnector, so as to have a supply of oxidizing gas and a recovery of remaining oxygen that are common to the first and second trapezoidal gas flow sectors.

The fuel may advantageously be hydrogen or methane ($CH_4$) or a mixture of the two.

Advantageously, the reforming is carried out at least partly with the water produced by oxidation.

Preferably, the first and the second trapezoidal gas flow sector are supplied with identical compositions and flow rates of gas in nominal operation. On the contrary, in the event that it is required to heat more, or cool more, one of the gas flow sectors of the stack compared to the other, it may be envisaged to not supply each gas flow sector in an identical manner.

This necessity may arise in the case of malfunction (leak, heating chamber in which the defective stack is placed, problem of thermal insulation): in this case, not supplying one gas flow sector compared to the other adjoining gas flow sector makes it possible to heat more, or cool more, one adjoining gas flow sector relative to the other.

Thus, the invention essentially consists in proposing a novel reactor or fuel cell architecture with an active section of the catalytic material of the methanation or reforming reaction integrated in the electrode which varies with the composition of the gases, as they are distributed, which depends on the electrochemistry of said electrode.

This variation of the active catalytic section encountered by the gases along their distribution is produced without modifying the electrochemical area of the cells and therefore the collection or conveying of current which remains identical to the prior art.

This variation of the catalytic section is produced by dividing the supply and the recovery of the gases into two independent circuits within each interconnector and by the physical separation of the flow surface of the gases on the electrode (and catalyst) by means of a barrier integrated into each electrical contact element, and also within the electrode, which define two adjoining gas flow sectors of trapezoidal form, the sum of the area of which is that of the square or rectangular electrochemical area of the cells.

Thus, for the same electrochemical area, the reactions at the electrodes comprising catalytic material(s) (cathodes in co-electrolysis reactor or anodes in fuel cell) may be promoted or not promoted depending on the change in the rate of the gases distributed, determined by the location of the large bases of the trapezoids; either at the inlet of the gases or at the outlet of the products resulting from the electrochemical reaction.

By virtue of the invention, within the same stack there is a decoupling between electrochemical reaction and catalytic activity, which in part makes it possible to better control the species produced along the flow of the gases, but above all makes it possible to control the heat of the stack by controlling the catalytic reaction without changing the electrochemical operating point.

Thus, in fuel cell mode, it is preferable to maximize rapid internal reforming so that the oxidation of the hydrogen can take place quickly so as not to damage the cells.

In co-electrolysis of $H_2O+CO_2$ mode, depending on the use envisaged for the synthesis gas ($H_2+CO$) on leaving the reactor, which has to be converted into methane or into other products, it is possible to promote in situ methanation within the reactor or, on the contrary, to prevent it.

In other words, by introducing a variation in the catalytic section between the electrode inlet and outlet, the invention makes it possible to decouple the catalytic methanation or reforming reaction from the electrochemical reaction which takes place within the stack of the reactor or, respectively, of the SOFC cell.

In addition, by determining beforehand the ratios of the dimensions between the inlet catalytic section and the outlet section, it is possible to define a precise and determined ratio as desired between catalytic reaction and electrochemical reaction.

Moreover, a subsequent advantage of the invention is the possibility of reducing the amount of water to be vaporized at the inlet of the co-electrolysis reactor, by virtue of the methanation reaction which may be promoted in situ. This is because a methanation reaction also forms water.

Therefore, promoting the implementation of methanation within a co-electrolysis reactor makes it possible to obtain water in situ that is already in vapor form and therefore to already have a part of the water required for the co-electrolysis, without needing to vaporize this amount of liquid water upstream.

This may have a considerable impact on the yield of an overall plant, especially since having water that is already in vapor form makes it possible to avoid vaporizing by a separate source of electricity, in the absence of an external source of heat, and therefore makes it possible to decrease the operating energy costs of the plant and thereby to obtain a better yield.

In addition, the novel architecture according to the invention has the advantage of improving the overall thermal homogeneity of each cell in the case of electrochemical or catalytic reactions that are generally exothermic or endothermic.

Indeed, sources of heat which arise at specific locations of the cell (typically either at the inlet or the outlet) can create thermal gradients which may be prohibitive in terms of the mechanical strength of this cell.

By virtue of the invention, the thermal gradients are greatly reduced along the cell, since each of these edges comprises both an inlet and an outlet (first and third zone, and also second and fourth zone). The temperature differences within each cell are therefore reduced by virtue of the design of the gas flow sectors within the stack.

The interconnectors envisaged in the context of the invention make it possible to preserve a cross-current circulation of the gases over the cells between the fuel and the oxidizer or draining gas.

The methods according to the invention do not modify the reversibility of a stack of this type which may be used equally well as a co-electrolysis SOEC reactor with optional in situ methanation, or as an SOFC cell with, as fuel, hydrogen and/or methane with internal reforming.

According to the first alternative, another subject of the invention is an SOEC co-electrolysis reactor for carrying out co-electrolysis of steam $H_2O$ and of carbon dioxide $CO_2$ and where appropriate an in situ methanation reaction comprising a stack of individual electrolysis cells of solid oxide type, with a rectangular or square area, each formed of a cathode comprising material(s) for catalyzing a methanation reaction, of an anode and of an electrolyte inserted between the cathode and the anode, a plurality of electrical and fluid interconnectors each arranged between two adjacent individual cells with one face thereof in electrical contact with the anode of one of the two individual cells and the other face thereof in electrical contact with the cathode of the other of the two individual cells, and a plurality of electrical contact and gas distribution elements, each arranged between a cathode and an interconnector, each electrical contact and gas distribution element integrating a sealing bead forming a gas distribution barrier separating a first gas flow sector (T1) comprising the first and third zones from a second gas flow sector (T2) comprising the second and fourth zones, the first and second gas flow sectors being adjoined by the barrier, forming an area substantially equal to that of each cell; the first to fourth zones being dimensioned, and the gas circulation barrier being arranged, such that the flow section of the gases increases or decreases between the first and third zones within the first gas flow sector (T1) and the flow section of the gases also increases or decreases between the second and fourth zones within the second gas flow sector (T2).

According to the second alternative, another subject of the invention is a high-temperature fuel cell (SOFC) for optionally carrying out internal reforming of methane ($CH_4$), comprising a stack of individual cells of solid oxide type, with a rectangular or square area, each formed of a cathode, of an anode comprising material(s) for catalyzing a reaction for reforming methane ($CH_4$), and of an electrolyte inserted between the cathode and the anode, a plurality of electrical and fluid interconnectors each arranged between two adjacent individual cells with one face thereof in electrical contact with the anode of one of the two individual cells and the other face thereof in electrical contact with the cathode of the other of the two individual cells, and a plurality of electrical contact and gas distribution elements, each arranged between a cathode and an interconnector, each electrical contact and gas distribution element separating a first gas flow sector (T1) comprising the first and third zones from a second gas flow sector (T2) comprising the second and fourth zones, the first and second gas flow sectors being adjoined by the barrier, forming an area substantially equal to that of each cell; the first to fourth zones being dimensioned, and the gas circulation barrier being arranged, such that the flow section of the gases increases or decreases between the first and third zones within the first gas flow sector (T1) and the flow section of the gases also increases or decreases between the second and fourth zones within the second gas flow sector (T2).

Within the context of the invention, each interconnector is advantageously a part consisting of three flat metal sheets, elongated along two axes of symmetry X, Y orthogonal to one another, one of the end metal sheets being intended to come into mechanical contact with the plane of a cathode of an individual electrochemical cell and the other of the end metal sheets being intended to come into mechanical contact with the plane of an anode of an adjacent individual electrochemical cell, in which device:

one of the end metal sheets, referred to as first end metal sheet, comprises a pierced central part, while the other end metal sheet, referred to as second end metal sheet, and also the central metal sheet, comprises a non-pierced central part, each of the three flat metal sheets comprises a central part, pierced at the periphery thereof, with six ports, the first to fourth ports of each metal sheet being elongated over a length corresponding to a portion of the length of the central part along one of the axes X of the metal sheets and being distributed in pairs on either side of said axis X, while the fifth and sixth ports are each elongated over a length corresponding substantially to the length of the central part along the other of the axes Y, the first end metal sheet also comprises a seventh and an eighth port arranged symmetrically on either side of the axis Y, inside its first to fourth ports, and are elongated over a length corresponding substantially to the length of the central part along the axis Y, while the other of the end metal sheets, referred to as second end metal sheet, also comprises a seventh, eighth, ninth and tenth port inside, respectively, its first, second, third and fourth ports, each of these seventh to tenth ports being elongated over a length corresponding substantially to the length of the first to fourth ports along the axis X, and the first to sixth ports of the central metal sheet are widened towards the interior relative, respectively, to the first to sixth ports of each end metal sheet, the first and second ports of the three metal sheets have substantially identical dimensions to one another and the third and fourth ports of the three metal sheets have substantially identical dimensions to one another, the length of the first and second ports being preferably greater than that of the third and fourth ports, the seventh and eighth ports of the second end metal sheet have substantially identical dimensions to those of the first and second ports thereof, while the ninth and tenth ports of the second end metal sheet have substantially identical dimensions to those of the third and fourth ports thereof, all the widened ports of the central metal sheet comprise, in their widened part, tongues of metal sheets spaced apart from one another, forming a comb, each of the slits defined between the edge of a widened slit and a tongue or between two consecutive tongues opening onto one of the inner ports, respectively of the first or of the second end metal sheet, the three metal sheets are laminated and assembled together such that:

the tongues of metal sheets form spacers between first and second end metal sheets, respectively between the fifth and seventh ports of the first end metal sheet, between the sixth and eighth ports of the first end metal sheet, between the first and seventh ports of the second end metal sheet, between the second and eighth ports of the second end metal sheet, between the third and ninth ports of the second end metal sheet, and between the fourth and tenth ports of the second end metal sheet, each of the first to sixth ports of one of the three metal sheets is individually in fluid communication respectively with one of the corresponding first to sixth ports of the two other metal sheets, the fifth and seventh ports of the first end metal sheet are in fluid communication via slits of the fifth widened port of the central metal sheet, while the sixth and eighth ports of the first end metal sheet are in fluid communication via slits of the sixth widened port of the central metal sheet, the first and seventh ports of the second end metal sheet are in fluid communication via slits of the first widened port of the central metal sheet, while the second and eighth ports of the second end metal sheet are in fluid communication via slits of the second widened port of the central metal sheet, the third and ninth ports of the second end metal sheet are in fluid communication via slits of the third widened port of the central metal sheet, and the fourth and tenth ports of the second end metal sheet are in fluid communication via slits of the fourth widened port of the central metal sheet.

Advantageously, the reactor and the SOFC cell constitute the same device intended to operate reversibly in co-electrolysis mode, where appropriate with in situ methanation, and in fuel cell mode, where appropriate with internal methane reforming.

Preferably, the cathodes comprise material(s) for catalyzing a methanation reaction, or the anodes comprise material(s) for catalyzing a reaction for reforming methane ($CH_4$), each preferably being based on nickel (Ni) supported by zirconia ($ZrO_2$), such as a cermet of nickel and yttriated zirconia, denoted Ni—YSZ.

According to an advantageous variant embodiment, each electrical contact and gas distribution element is a nickel (Ni) screen integrating, as sealing barrier, a bead based on glass and/or glass-ceramic.

Preferably, this barrier also penetrates the porous electrode (cathode for the HTE reactor, anode for cell), such as an electrode made of Ni—YSZ cermet. This thus creates complete leaktightness between the two adjoining gas flow sectors of the same circulation compartment.

In summary, the methods and electrolyzer/fuel cell according to the invention have numerous characteristics and advantages, among which mention may be made of:

physical separation of the electrochemical area of the same cell into two adjoining and independent gas flow sectors of trapezoidal form (in a view facing the cell), the trapezoidal form defining a section of catalytic material which varies gradually with the composition of the gases along the flow in this section;

the physical separation is produced by integration of a gas sealing barrier within the electrical contact and gas distribution element, and also within the porous electrode for circulation of $H_2$. Preferably, the barrier is a glass or glass-ceramic bead integrated into a nickel screen, the glass or the glass-ceramic penetrating both the screen and the electrode;

control of the predominance or non-predominance of the catalytic reactions compared to the electrochemical reactions, by determining beforehand the geometry of the two trapezoidal gas flow sectors, especially the length ratio between small and large base of each trapezoid. With the inlet of the gases via the large base of the gas flow sectors, the catalytic section decreases and the gas rate increases along their distribution over each cell, which makes it possible to reduce the catalytic reactions involved along the electrochemical distribution. Conversely, with the inlet of the gases via the small base of the gas flow sectors, the catalytic section increases and the gas rate decreases along their distribution over each cell, which makes it possible to promote the catalytic reactions involving the gases produced by electrochemistry along the distribution;

an improvement in the thermal homogeneity of the cells of the stack compared to those of an HTE reactor or SOFC electrolysis cell at high temperature according to the prior art;

possible control of the methane obtained within a co-electrolysis reactor at high temperature and preferably operating under pressure, preferably between 5 and 30 bar;

possible control of the synthesis gas obtained within an SOFC cell by internal reforming, thereby determining the thermal behavior of the cell;

possible control of the steam formed within an SOEC co-electrolysis stack itself, by promoting the in situ methanation reaction, which makes it possible to save some of the energy of vaporization of water required upstream of the stack and thereby enables a gain in the yield from a plant comprising the co-electrolysis reactor according to the invention.

"Cathode-supported cell" (CSC) is used here and in the context of the invention according to the definition already given in the field of high-temperature electrolysis HTE of water, that is to say to mean a cell in which the electrolyte and the oxygen electrode (anode) are arranged on the thicker hydrogen or carbon monoxide electrode (cathode) which thus serves as support.

In the context of the invention, "reversible" is intended to mean that the SOFC fuel cell may be used as SOEC electrolyzer in electrolysis operating mode, which is the reverse of that of the cell, the anode(s) of the SOFC cell then serving as cathode(s) of the electrolyzer.

DETAILED DESCRIPTION

Other advantages and features of the invention will become more clearly apparent on reading the detailed nonlimiting and illustrative description of exemplary embodiments of the invention given with reference to the following figures, in which:

FIG. 1 is a schematic view showing the operating principle of a high-temperature water electrolyzer, FIG. 2 is a schematic exploded view of a part of a high-temperature steam co-electrolyzer comprising interconnectors according to the state of the art, FIG. 3 is a schematic sectional view of a co-electrolysis reactor implementing the method for high-temperature co-electrolysis according to one mode of the invention, FIG. 4 is a schematic top view of a co-electrolysis reactor implementing the method for high-temperature co-electrolysis according to one mode of the invention, FIG. 5 is a schematic top view of a co-electrolysis reactor implementing the method for high-temperature co-electrolysis according to another mode of the invention which is alternative to that of FIG. 4, FIG. 6A is an exploded view from beneath of a part of a co-electrolysis reactor according to the invention with interconnectors and an electrical contact and gas distribution element enabling independent supply and circulation for cathode gases ($H_2O$, $CO_2$, $H_2$, $CO$, $CH_4$) in counterflow from one gas flow sector of trapezoidal form to another which is adjoining, the sum of the areas of which is equal to that of a co-electrolysis cell, FIG. 6B is an exploded top view of the part of the reactor shown in FIG. 6A, the supply/recovery of the draining gas and of the oxygen produced being common to the two trapezoidal gas flow sectors, FIG. 7 is an exploded view of an interconnector of a co-electrolysis reactor according to one embodiment of the invention, which enables independent supply and circulation of cathode gases ($H_2O$, $CO_2$, $H_2$, $CO$, $CH_4$) from one gas flow sector of trapezoidal form to another which is adjoining, the sum of the areas of which is equal to that of a co-electrolysis cell.

Figure 8A:
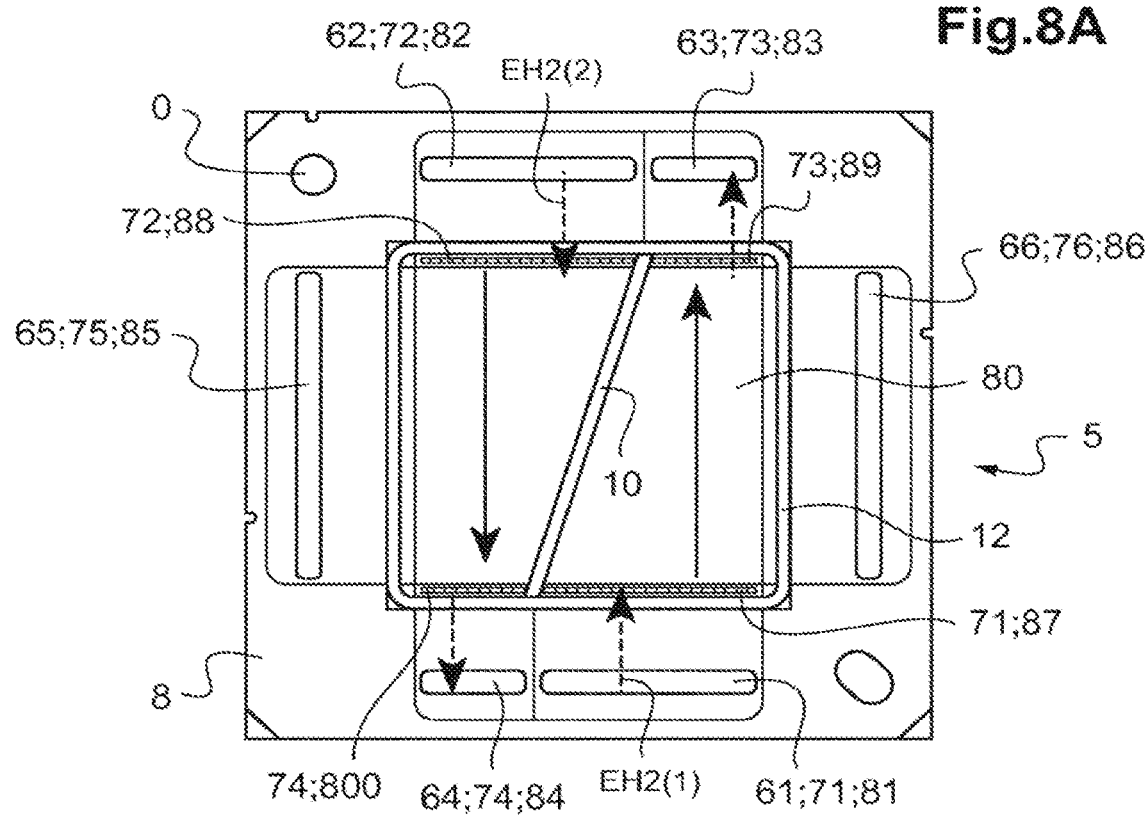
Figure 8B:
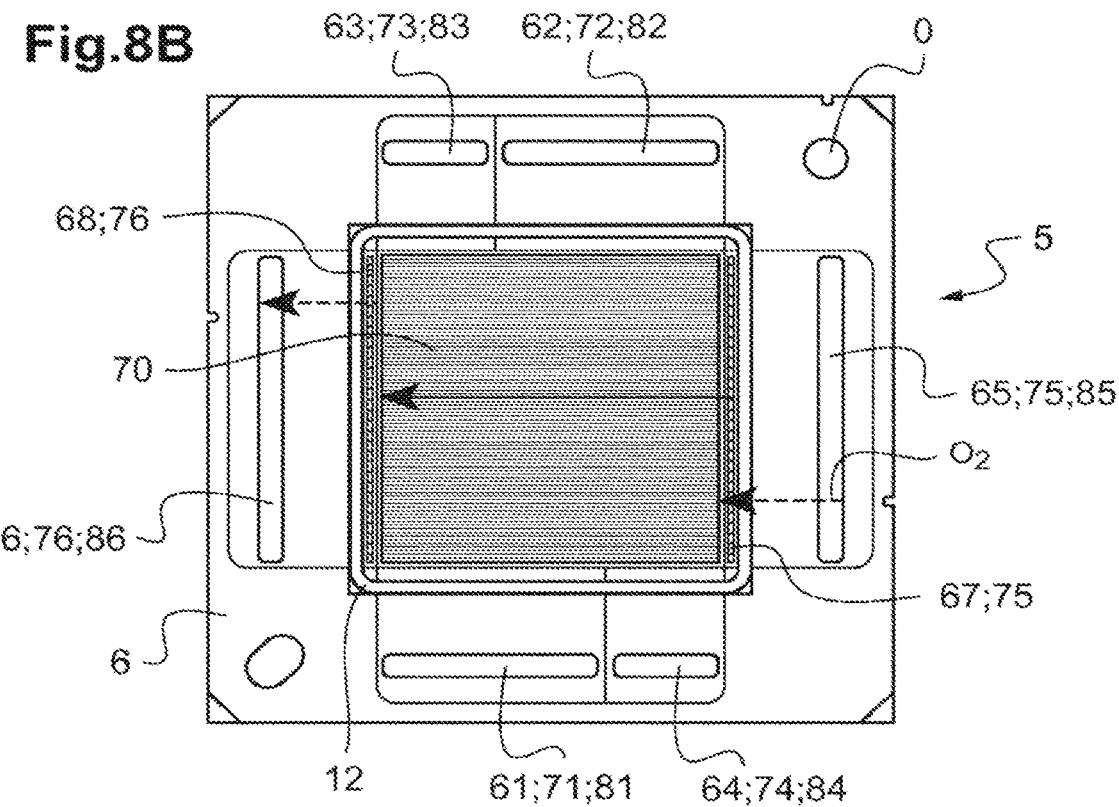
Figure 9A:
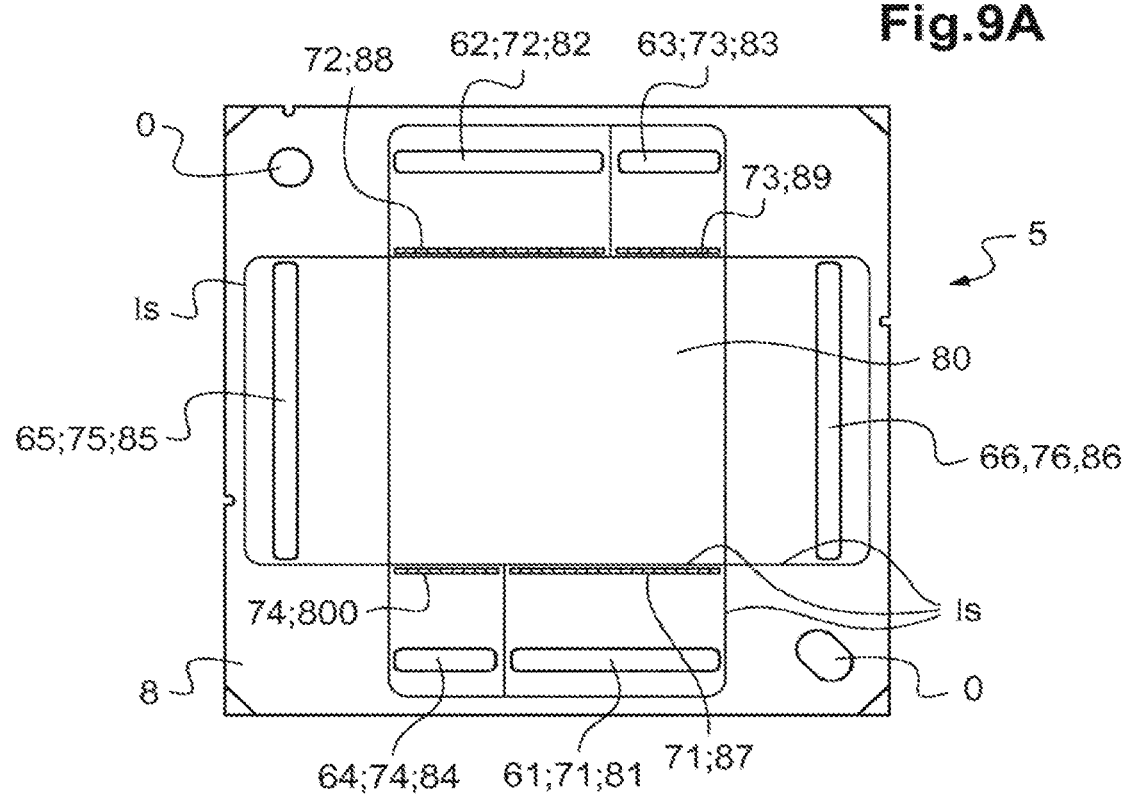
Figure 9B:
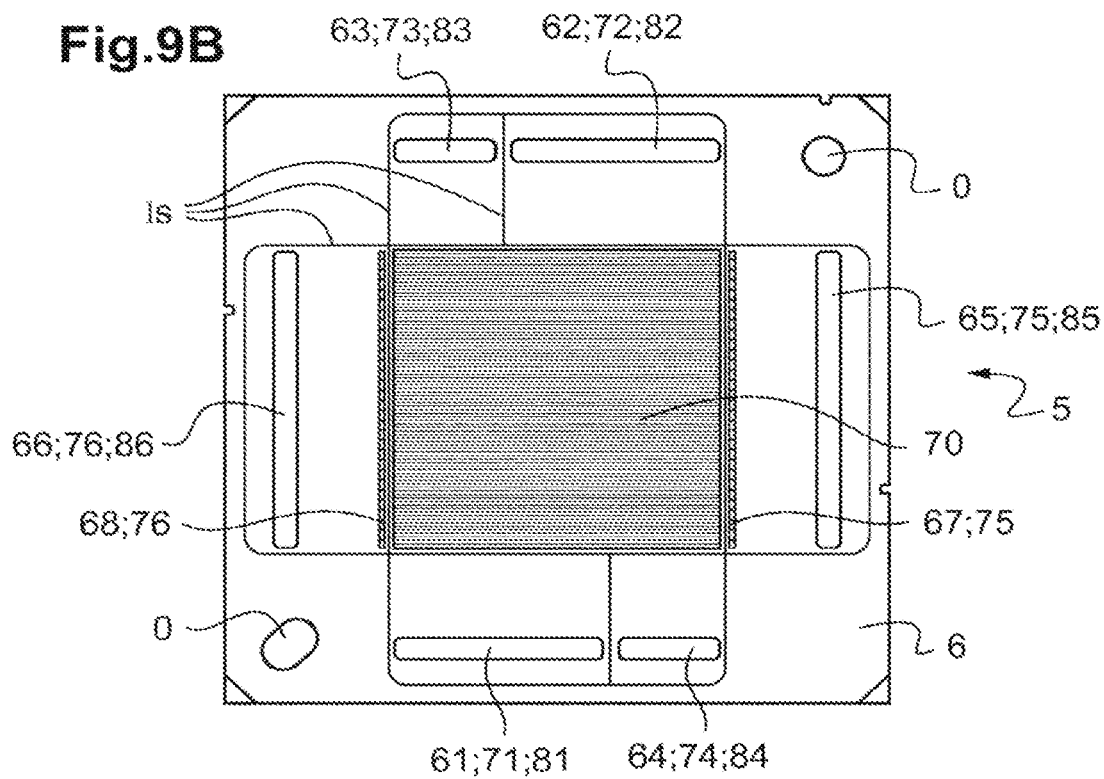
Figure 10A:
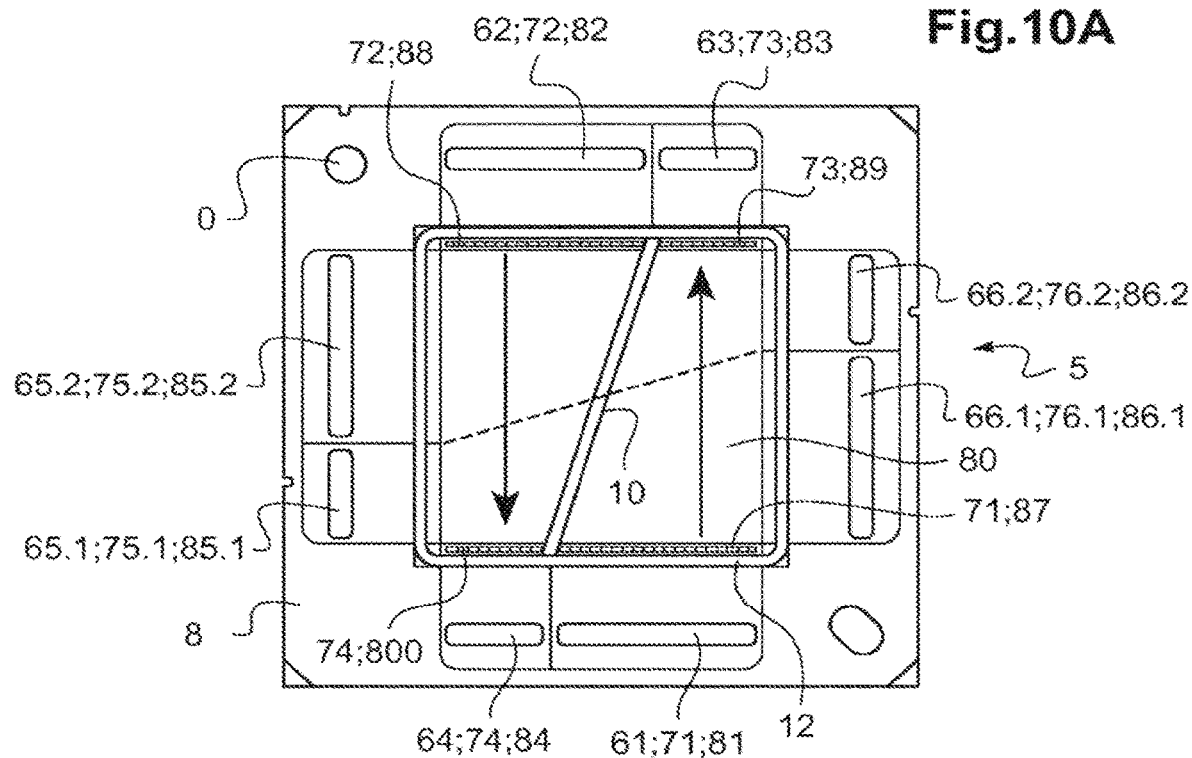
Figure 10B:
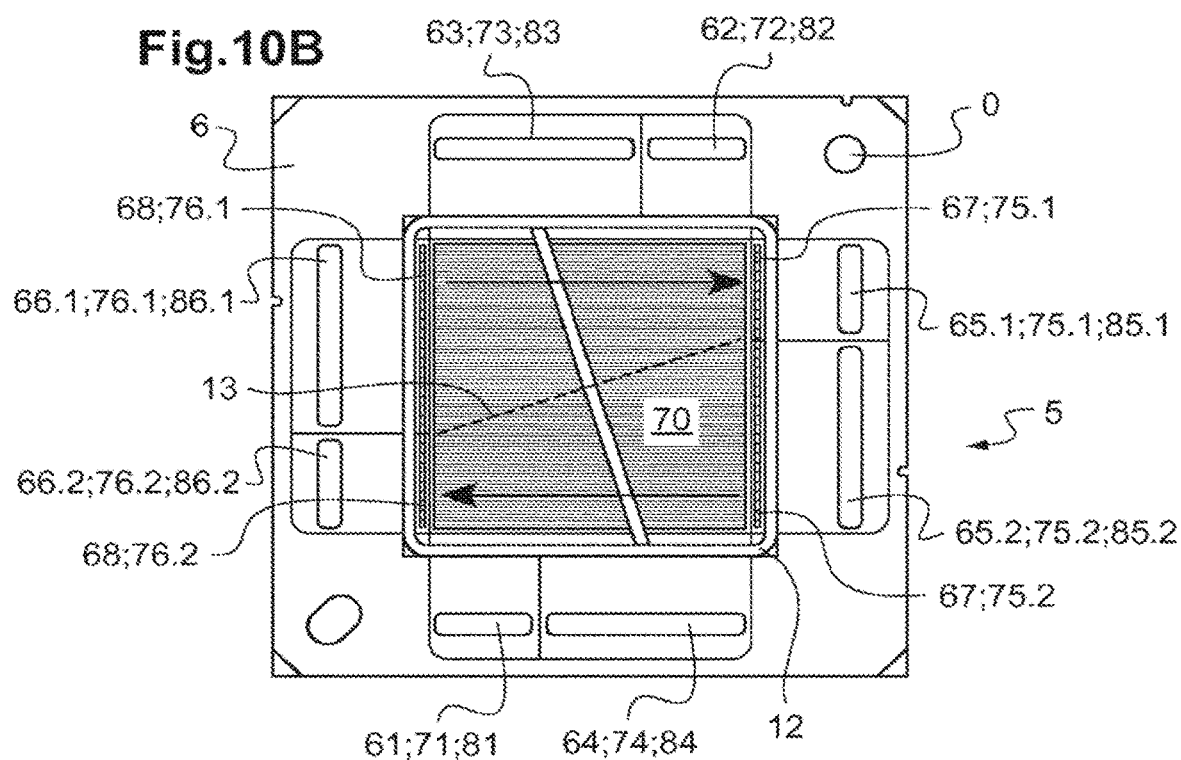

FIGS. 8A and 8B are front views respectively of either side of an interconnector of a co-electrolysis reactor according to the invention, more specifically showing the arrangement of the sealing beads including the barrier delimiting the trapezoidal gas flow sectors in accordance with the invention, and also the path of the gases, the circulation of the oxygen produced occurring in a single compartment over the whole area of the anode;

FIGS. 9A and 9B correspond respectively to FIGS. 8A and 8B, more specifically showing the arrangement of the weld seams of the three flat metal sheets forming an interconnector according to the invention, FIGS. 10A and 10B are front views respectively of either side of an interconnector of a co-electrolysis reactor according to the invention, more specifically showing the arrangement of the sealing beads including the barrier delimiting the trapezoidal gas flow sectors in accordance with the invention, and also the path of the gases with the circulation of the oxygen produced occurring in two distinct trapezoidal gas flow sectors.

It is specified here that, in all of FIGS. 1 to 10B, the symbols and arrows of supply firstly of steam $H_2O$ and of carbon dioxide $CO_2$, of distribution and recovery of the products of the co-electrolysis with, where appropriate, of the in situ methanation reaction, and of oxygen $O_2$ and of the current are shown for the purposes of clarity and precision, to illustrate the operation of a steam and $CO_2$ co-electrolysis reactor according to the state of the art and of a steam co-electrolysis reactor according to the invention.

It is also specified that, throughout the application, the terms "above", "below", "vertically in line with", "vertical", "lower", "upper", "bottom", "top", "below" and "above" should be understood with reference to an SOEC electrolysis reactor or an SOFC cell in the vertical configuration in operation, that is to say with the planes of interconnectors and electrochemical cells being horizontal, the $O_2$ electrode below the $H_2$ electrode. It is finally specified that all the electrolyzers described are of solid oxide type (SOEC, acronym for Solid Oxide Electrolysis Cell) operating at high temperature. The high operating temperature of an electrolyzer (electrolysis reactor) is typically between 600° C. and 950° C.

Typically, the characteristics of an individual SOEC electrolysis cell suitable for the invention, of the cathode ($H_2$ electrode)-supported type (CSC), may be those indicated as follows in table 2 below.

TABLE 2

| Electrolysis cell | Unit | Value |
|---|---|---|
| Cathode 2 | | |
| Material from which it is made | | Ni-YSZ |
| Thickness | μm | 315 |
| Thermal conductivity | W m$^{-1}$ K$^{-1}$ | 13.1 |
| Electrical conductivity | Ω$^{-1}$ m$^{-1}$ | 10$^5$ |
| Porosity | | 0.37 |
| Permeability | m$^2$ | 10$^{-13}$ |
| Tortuosity | | 4 |
| Current density | A · m$^{-2}$ | 5300 |
| Anode 4 | | |
| Material from which it is made | | LSM |
| Thickness | μm | 20 |
| Thermal conductivity | W m$^{-1}$ K$^{-1}$ | 9.6 |
| Electrical conductivity | Ω$^{-1}$ m$^{-1}$ | 1 × 10$^4$ |
| Porosity | | 0.37 |
| Permeability | m$^2$ | 10$^{-13}$ |
| Tortuosity | | 4 |
| Current density | A · m$^{-2}$ | 2000 |
| Electrolyte 3 | | |
| Material from which it is made | | YSZ |
| Thickness | μm | 90 μm in support electrolyte and 5 μm in support electrode |
| Resistivity | Ωm | 0.42 |

Typically, the area of a cell is of the order of 100 cm$^2$.

Figure 1:
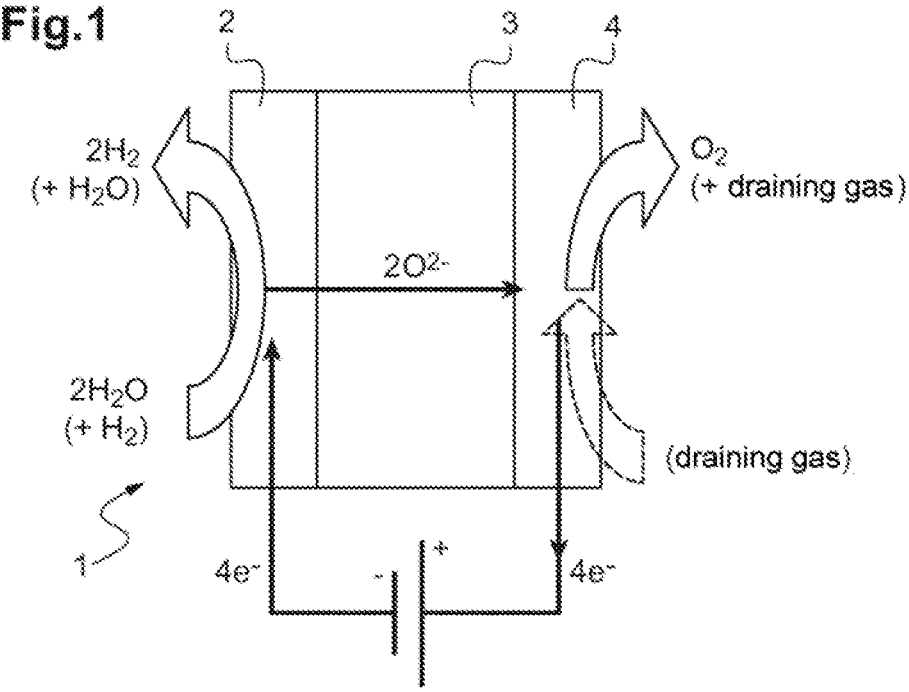
Figure 2:
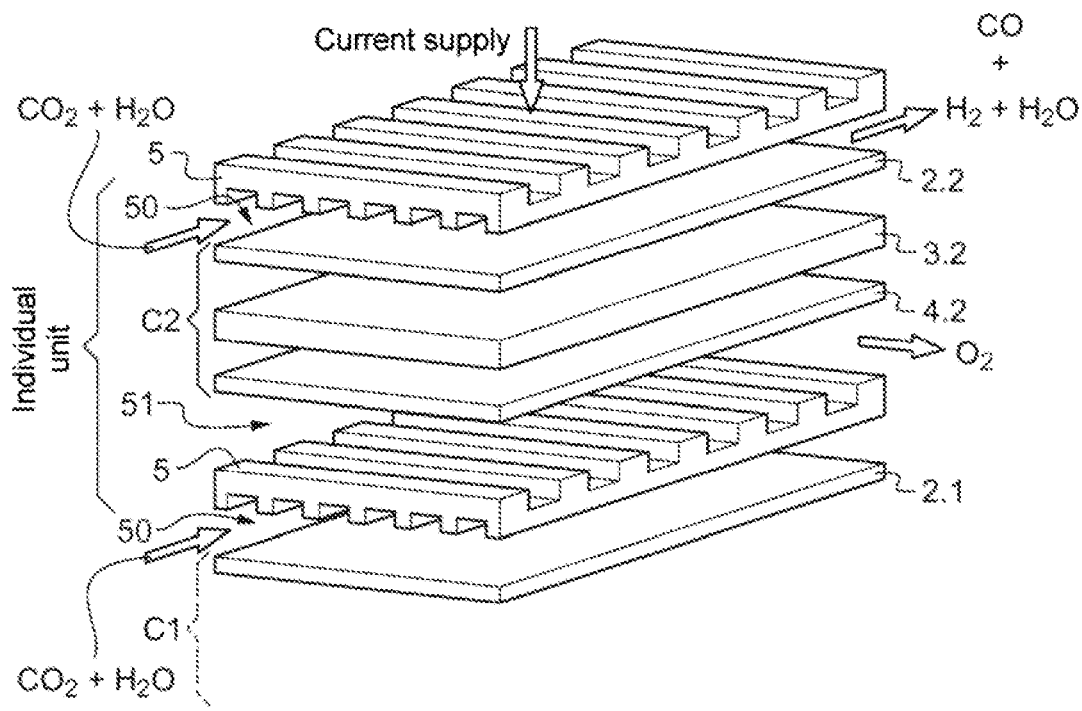

FIGS. 1 and 2 have already been described in detail in the preamble. They are therefore not described hereafter.

By convention, and in order to facilitate the reading of the circulations of the gases in the different figures, the following symbols are used:

EH2(1): denotes the inlet of the gases circulating through the stack of the mixture of steam and of carbon dioxide supplying a trapezoidal gas flow sector T1 of the co-electrolysis cells C1, C2 . . . ;

SH2(1): denotes the outlet of the gases circulating through the stack and containing the products of the co-electrolysis reaction and, where appropriate, of in situ methanation, recovered at the outlet of a trapezoidal gas flow sector T1 of the co-electrolysis cells C1, C2;

EH2(2): denotes the inlet of the gases circulating through the stack of the mixture of steam and of carbon dioxide supplying a trapezoidal gas flow sector T2 of the co-electrolysis cells C1, C2 . . . ;

S12(2): denotes the outlet of the gases circulating through the stack and containing the products of the co-electrolysis reaction and, where appropriate, of in situ methanation, recovered at the outlet of a trapezoidal gas flow sector T2 of the co-electrolysis cells C1, C2;

$E(O_2)$: denotes the inlet of the oxidizing gas circulating through the stack and supplying all the co-electrolysis cells C1, C2;

$S(O_2)$: denotes the outlet of the oxidizing gas circulating through the stack and containing the oxygen produced at the co-electrolysis cells C1, C2.

The inventors were able to analyze that it was possible to envisage directly producing methane within a co-electrolysis reactor itself, depending on typical conditions of temperature and pressure.

Armed with this observation, the inventors also highlighted that, despite the numerous developments in the architectures of solid oxide cell stack reactors, and more particularly the interconnectors, it is not possible to promote or not promote, as desired, the catalytic reactions within the existing reactors independently of the electrochemical operation, due to the fact that the catalytic and electrochemical areas are the same and correspond to the area of the cermet.

Thus, in order to overcome this difficulty, they conceived of defining a reactor with a catalytic section of the cathode which varies with the composition of the gases along the distribution. They then conceived of dividing the active area of the cathode into two adjoining trapezoidal gas flow sectors, the sum of the areas of which corresponds to the total area of an electrochemical cell, and in which the circulation of the gases in one of the gas flow sectors is in counterflow to the other.

Thus, for the same electrochemical area of the cell (the sum of the two trapezoids), the catalytic methanation reaction may be promoted or not promoted by the change in the rate of the gases within these gas flow sectors, and also by the catalytic section passed through by a given mixture of gas along the path of the cell. The prior determination of the form of the trapezoids, especially the length ratio of the bases thereof, makes it possible to control this ratio between methanation reaction and electrochemical co-electrolysis reaction.

The method of co-electrolysis of steam $H_2O$ and of carbon dioxide $CO_2$ and, where appropriate, of in situ methanation, according to the invention is carried out in a reactor 1 comprising a stack of individual electrolysis cells C1, C2 . . . of solid oxide type, of rectangular or square surface.

Each cell C1, C2 . . . is formed of a cathode 2.1, 2.2 . . . comprising material(s) catalyzing the methanation reaction, of an anode 4.1, 4.2 . . . and of an electrolyte 3.1, 3.2 . . . inserted between the cathode and the anode.

The stack also comprises a plurality of electrical and fluid interconnectors 5 each arranged between two adjacent individual cells C1, C2 with one face thereof in electrical contact with the anode 4.1 of one C1 of the two individual cells and the other face thereof in electrical contact with the cathode 2.2 of the other C2 of the two individual cells, and a plurality of electrical contact and gas distribution elements 9, each arranged between a cathode and an interconnector.

In accordance with the invention, each electrical contact and as distribution element 9 integrates a sealing bead 10 as schematically illustrated in FIGS. 4 and 5. Preferably in order to produce these beads, a glass or glass-ceramic bead is deposited on each of the nickel screens, which penetrates both the nickel screen and the porous cathode, and a leaktight separation is thus produced between the two adjoining gas flow sectors T1, T2 of the the cathode compartments.

In addition, as illustrated in FIGS. 3 to 5, a first zone (inlet EH2(1) on the left of FIG. 3 and at the top of FIG. 4) and a second zone (inlet EH2(2) on the right of FIG. 3 and at the bottom of FIG. 4) of each interconnector 5, is independently supplied with a mixture of steam $H_2O$ and of carbon dioxide $CO_2$ and it is distributed to the cathode 2.1, 2.2 of each individual cell C1, C2 . . . then the synthesis gas produced (mixture of carbon monoxide CO and hydrogen $H_2$) and where appropriate the additional mixture of methane $CH_4$ and of steam $H_2O$ produced by methanation are recovered in a third zone (outlet SH2(1) at the bottom of FIG. 4) and a fourth zone (outlet SH2(2) at the top of FIG. 4) of each interconnector in fluid communication respectively with the first zone and the second zone, the sealing bead 10 forming a gas distribution barrier 10 separating the first trapezoidal gas flow sector (T1) comprising the first and third zones from a second trapezoidal gas flow sector (T2) comprising the second and fourth zones, the first and second gas flow sectors being adjoined by the barrier, forming an area substantially equal to that of each cell; the first to fourth zones being dimensioned, and the gas circulation barrier being arranged, such that the flow section of the gases increases or decreases between the first and third zones within the gas flow sector (T1) and the flow section of the gases also increases or decreases between the second and fourth zones within the second gas flow sector (T2).

All the first to fourth zones of the interconnectors 5 are situated individually vertically in line respectively with the first to fourth zones of the other interconnectors 5 of the stack.

In addition, as can be seen in FIGS. 4 and 5, the first and second zones of each interconnector are supplied such that the circulation to each cathode in the first trapezoidal gas flow sector T1 is in counterflow to the circulation in the second trapezoidal gas flow sector T2.

In the configuration according to FIG. 4, the mixture of steam and carbon dioxide is supplied via the largest base of the trapezoidal gas flow sectors T1 and T2, in order to minimize the in situ methanation reaction compared to the co-electrolysis reaction within the stack, the catalytic area decreasing along the path of the gases produced for the same electrochemical area.

In the configuration according to FIG. 5, the mixture of steam and carbon dioxide is supplied via the smallest base of the trapezoidal gas flow sectors T1 and T2, in order to maximize the methanation reaction compared to the co-electrolysis reaction within the stack, the catalytic area increasing along the path of the gases produced for the same electrochemical area.

The interconnectors 5 may also be produced to arrange the different zones for supply and recovery of the draining gas and of the oxygen produced such that their circulation at the cells C1 is in co-current to the circulation at the cells C2, or in counter-current thereto.

Figure 6A:
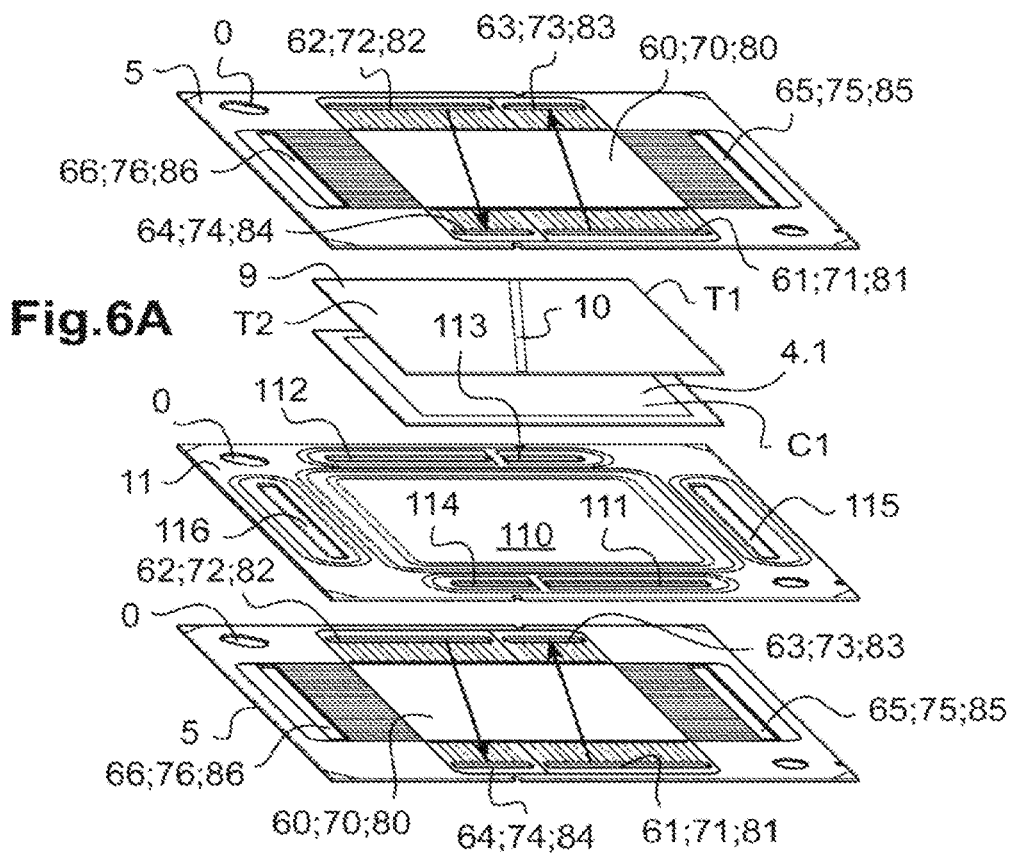
Figure 6B:
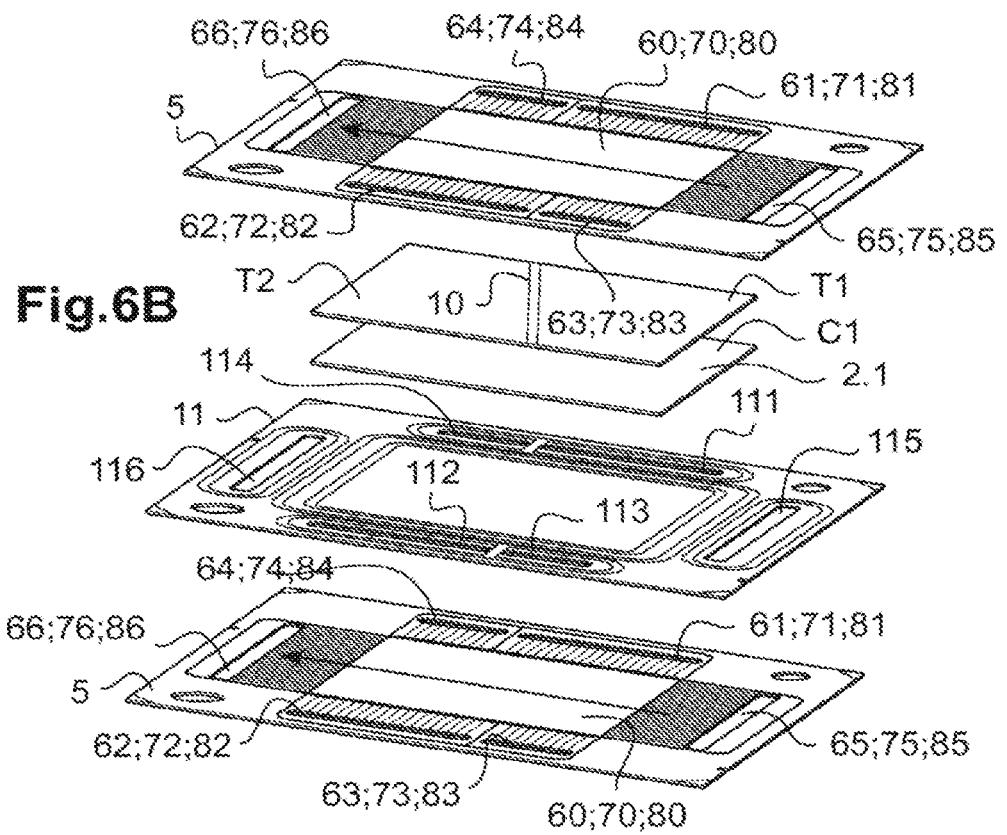

FIGS. 6A and 6B show a schematic representation of a part of a high-temperature solid oxide co-electrolyzer (SOEC) according to the invention.

This co-electrolysis reactor comprises a stack of individual electrolysis cells of SOEC type (C1, C2), each formed of a cathode 2.1, 2.2, of an anode 4.1, 4.2, and of an electrolyte 3.1, 3.2, inserted between the cathode and the anode.

A fluid and electrical interconnector 5 is arranged between two adjacent individual cells C1, C2, with one face thereof in electrical contact with the anode of one of the two individual cells and the other face thereof in electrical contact with the cathode of the other of the two individual cells.

As shown in FIGS. 6A and 6B, insulation and leaktightness frames 11 are also provided, making it possible to provide electrical insulation between two adjacent interconnectors 5. Each frame 11 is pierced with ports O, suitable for accommodating rods for fixing the stack, and also seals 12 provided to produce leaktightness around the ports for supplying the gases in co-electrolysis, $H_2O$, $CO_2$, air, and for recovering the gases produced, $H_2$, CO, $O_2$ with air, and also around the cell.

The same electrical current passes through all the electrolysis cells C1 and C2.

In the reactor according to the invention, all the cathode compartments 50 of the cells C1, C2 of the same trapezoidal gas flow sector T1 or T2, in which the supply mixture of steam $H_2O$ and of $CO_2$ and the hydrogen produced $H_2$ with optional syngas circulate, communicate with one another. On the other hand, the circulation of the gases within each cathode compartment 50 of the trapezoidal gas flow sector T1 is independent of that of the as flow sector T2.

The co-electrolysis reaction produces oxygen which is collected by all the anode compartments 51 which communicate with one another.

According to the invention, each electrical contact and gas distribution element 9 integrating a sealing bead 10 forms a gas distribution barrier between on the one hand a first 61, 71, 81 and a third 63, 73, 83 interconnector zone 5 and on the other hand a second 62, 72, 82 and a fourth 64, 74, 84 interconnector zone.

The first to fourth interconnector zones 5 are dimensioned, and the gas circulation barrier 10 is arranged, such that the distribution of the gases between the first 61, 71, 81 and the third 63, 73, 83 zone is carried out in a first gas flow sector T1 of trapezoidal form. The distribution of the gases between the second 62, 72, 82 and the fourth zone 64, 74, 84 is carried out in a second as flow sector T2 of trapezoidal form.

As can be seen in FIG. 6B, the two trapezoidal gas flow sectors T1 and T2 are adjoined by the barrier 10, forming an area substantially equal to the rectangular or square area of each cell.

In addition, as shown in FIGS. 8A and 8B, a seal 12 ensures leaktightness at the periphery of the cathode compartment 50. The barrier 10 also adjoins this seal 12.

Figure 7:
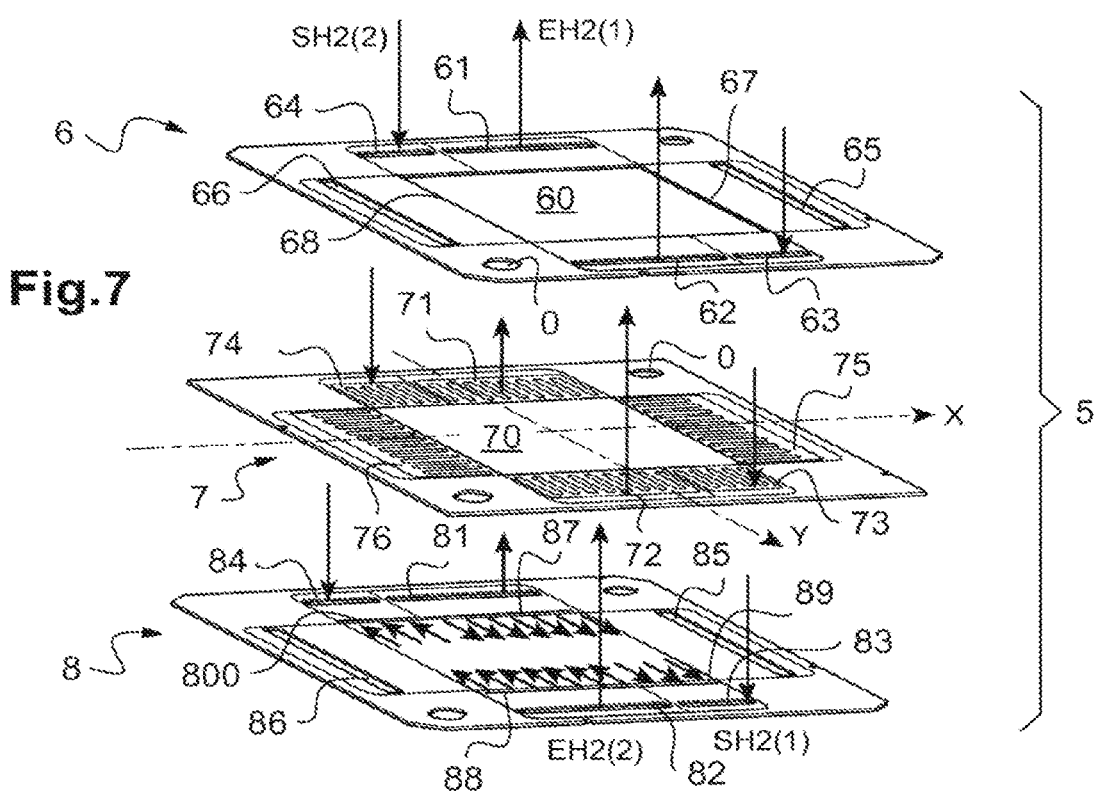
FIG. 7A is a view of a detail of FIG. 7.
FIG. 7B is a perspective view of a detail of FIG. 7.

FIG. 7 shows an exploded view of an interconnector 5 according to the invention, making it possible to provide the supply of steam $H_2O$ and $CO_2$, the counterflow circulation in the two trapezoidal gas flow sectors of the mixture of steam, of $CO_2$ and of the syngas produced at the cells C1, C2, and also the recovery of the oxygen $O_2$ produced within the stack.

The interconnector 5 consists of three flat metal sheets 6, 7, 8, elongated along two axes of symmetry (X, Y) orthogonal to one another, the flat metal sheets being laminated and assembled together by welding. A central metal sheet 7 is inserted between a first 6 and a second 8 end metal sheet.

The second 8 end metal sheet is intended to come into mechanical contact with the plane of a cathode 2.1 of an individual electrolysis cell C1 and the central metal sheet 7 is intended to come into mechanical contact with the plane of an anode 4.1 of an adjacent individual electrolysis cell, each of the two adjacent individual electrolysis cells (C1, C2) of SOEC type being formed from a cathode 2.1, 2.2, from an anode 4.1, 4.2, and from an electrolyte 3.1, 3.2, inserted between the cathode and the anode.

Each of the three flat metal sheets 6, 7, 8 comprises a central part 60, 70, 80.

The first end metal sheet 6 comprises a pierced central part 60, while the second end metal sheet 8, and also the central metal sheet 7, comprises a non-pierced central part, respectively 80 and 70.

Each metal sheet 6, 7, 8 is pierced, at the periphery of the central part thereof, with six ports 61, 62, 63, 64, 65, 66; 71, 72, 73, 74, 75, 76; 81, 82, 83, 84, 85, 86.

The first 61, 71, 81 to fourth 64, 74, 84 ports of each metal sheet are elongated over a length corresponding to a portion of the length of the central part 60, 70, 80 along one of the axes X of the metal sheets, and are distributed pairwise on either side of said axis X.

The fifth 65, 75, 85 port is elongated over a length corresponding substantially to the length of the central part 60, 70, 80 along the other of the axes Y.

The sixth 66, 76, 86 port is elongated over a length corresponding substantially to the length of the central part 60, 70, 80 along the other of the axes Y.

The first 6 end metal sheet also comprises a seventh 67 and an eighth 68 port arranged symmetrically on either side of the axis Y, inside its first to fourth ports 61 to 64, and are elongated over a length corresponding substantially to the length of the central part along the axis Y.

The second 8 end metal sheet also comprises a seventh 87, eighth 88, ninth 89 and tenth 800 port inside, respectively, its first 81, second 82, third 83 and fourth 84 ports, each of these seventh to tenth ports being elongated over a length corresponding substantially respectively to the length of the first to fourth ports along the axis X.

As can be seen in FIG. 7, the first 71 to sixth 76 ports of the central metal sheet are widened towards the interior relative, respectively, to the first 61, 81 to sixth 66, 86 ports of each end metal sheet 6, 8.

The first 61, 71, 71 and second 62, 72, 82 ports of the three metal sheets 6, 7, 8 are of substantially identical dimensions to one another.

The third 63, 73, 83 and fourth 64, 74, 84 ports of the three metal sheets 6, 7, 8 are of substantially identical dimensions to one another.

The length of the first 61, 71, 71 and second 62, 72, 82 ports is greater than that of the third 63, 73, 83 and fourth 64, 74, 84 ports of the three metal sheets 6, 7, 8. The length ratio between that of the first and second ports and that of the third and fourth ports determines the geometrical form of the trapezoidal pas flow sectors T1, T2 and therefore determines the ratio that it will be possible to obtain between the in situ methanation reaction and the electrochemical co-electrolysis reaction.

The seventh 87 and eighth 88 ports of the second end metal sheet 8 are of substantially identical dimensions to those of the first 81 and second 82 ports thereof.

The ninth 89 and tenth 800 ports of the second end metal sheet 8 are of substantially identical dimensions, in the X direction, to those of the third 83 and fourth 84 ports thereof.

All the widened ports 71 to 76 of the central metal sheet 7 comprise, in their widened part, tongues of metal sheets spaced apart from one another, forming a comb, each of the slits defined between the edge of a widened slit and a tongue or between two consecutive tongues opening onto one of the inner ports 67, 68 or 87, 88, 89, 800, respectively of the first 6 or of the second 8 end metal sheet, The lamination and the assembly of the three metal sheets 6, 7, 8 with one another are carried out such that:

the tongues of metal sheets form spacers between first 6 and second 8 end metal sheets, respectively between the fifth 65 and seventh 67 ports of the first end metal sheet 6, between the sixth 66 and eighth 68 ports of the first end metal sheet 6, between the first 81 and seventh 87 ports of the second end metal sheet 8, between the second 82 and eighth 88 ports of the second end metal sheet 8, between the third 83 and ninth 89 ports of the second end metal sheet, and between the fourth 84 and tenth 800 ports of the second end metal sheet 8, each of the first 71 to sixth 76 ports of the central metal sheet 7 is individually in fluid communication respectively with one of the corresponding first 61, 81 to sixth 66, 86 ports of the two other metal sheets 6, 8, the fifth 65 and seventh 67 ports of the first end metal sheet 6 are in fluid communication via slits of the fifth widened port 75 of the central metal sheet 7, while the sixth 66 and eighth 68 ports of the first end metal sheet are in fluid communication via slits of the sixth widened port 76 of the central metal sheet 7, the first 81 and seventh 87 ports of the second end metal sheet 8 are in fluid communication via slits of the first widened port 71 of the central metal sheet 7, while the second 82 and eighth 88 ports of the second end metal sheet 8 are in fluid communication via slits of the second widened port 72 of the central metal sheet 7, the third 83 and ninth 89 ports of the second end metal sheet are in fluid communication via slits of the third widened port 73 of the central metal sheet 7, and the fourth 84 and tenth 800 ports of the second end metal sheet 8 are in fluid communication via slits of the fourth widened port 74 of the central metal sheet 7.

Figure 7A:
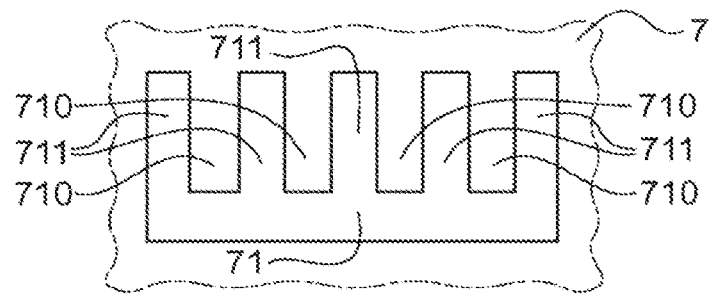
Figure 7B:
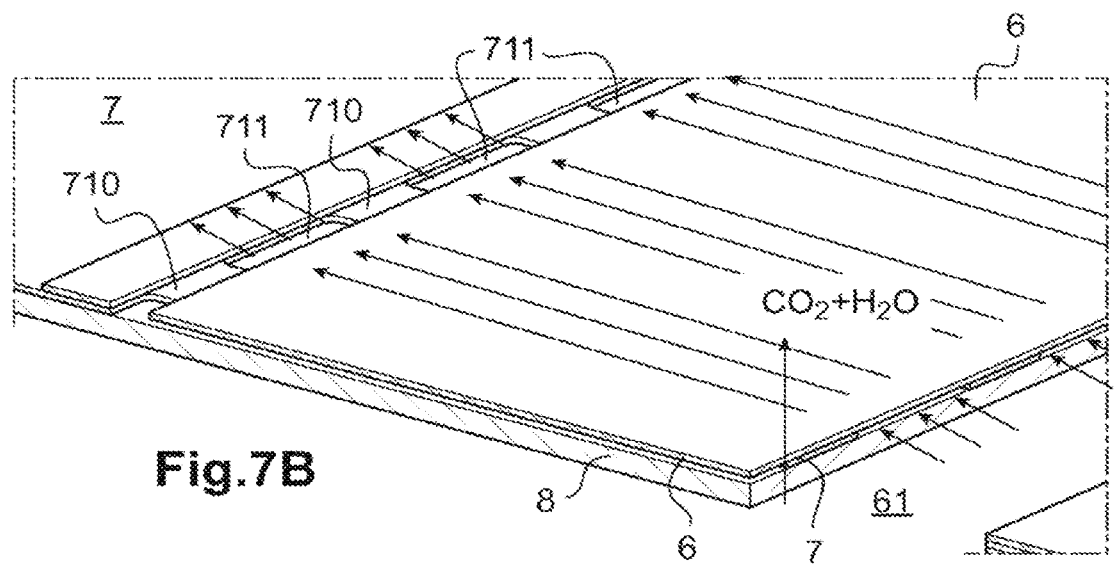

FIGS. 7A and 7B show in detail the production of the comb formed by the tongues of metal sheet 710 at the widened slit 71 of the central metal sheet and its arrangement between the two end metal sheets 6, 8 in order to enable the supply of a cell, here a mixture of steam $H_2O$ and of carbon dioxide $CO_2$. Thus, the comb formed 710, 711 enables the mixture to pass from the supply manifold 61, 71, 81 to the distribution slit 87, by passing into the space between the two end metal sheets 6, 8. The thickness of the central metal sheet 7 at this comb 710, 711 provides it with a spacer function and thereby guarantees the height of the passage for the gas mixture into the space between the end metal sheets 6, 8. Such a passage of gases according to the invention via the inside of the interconnector 5a has the advantage of liberating a flat surface for producing seals. In addition, by virtue of these comb forms for the widened slits 71,72, on one side and 75 on the other, a homogeneous distribution of each gas ($H_2O$, $CO_2$, Air) is obtained over each trapezoidal gas flow sector of a co-electrolysis cell, and by virtue of these comb forms for widened slits on one side 73, 74 and 76 on the other, a recovery of the gases produced ($H_2$, CO, $O_2$).

The operating method of a co-electrolysis reactor according to the invention, as has just been described, will now be described with reference to FIGS. 8A and 8B:

The first ports 61, 71, 81 are supplied with a mixture of steam and of carbon dioxide $CO_2$ of the interconnector 5 (see reference EH2(1)) and simultaneously but separately the second ports 62, 72, 82 of the same interconnector 5 are also supplied preferably with the same mixture and the same flow rate (see reference EH2(2)).

The path within an interconnector 5 of the gas mixture injected, converting gradually into $H_2$+CO, is schematically depicted in FIG. 8A. It can be seen that each trapezoidal gas flow sector T1 is passed through by the mixture in counter-flow to that which passes through the adjoining trapezoidal gas flow sector T2. The barrier 10 within the electrical contact element 9 and the electrode 2.1, preferably a nickel screen, and the peripheral seal, preferably made of glass, enable perfect leaktightness between on the one hand the two gas flow sectors T1 and T2 and relative to the exterior of the stack on the other hand.

In addition, the fifth 65, 75, 85 ports of the three metal sheets 6, 7, 8 of each interconnector 5 are supplied with a draining gas (reference E($O_2$)), such as air or pure oxygen.

The path of the air as draining gas injected and of the oxygen produced within an interconnector 5 is schematically illustrated in FIG. 8B.

The hydrogen and the CO produced (reference SH2(1)) by the co-electrolysis of steam and of $CO_2$ and also, where appropriate, the methane produced by the methanation reaction within the electrode 2.1 itself are thus recovered at gas flow sector T1 of the cells, in the third ports 63, 73, 83 of each interconnector 5.

The hydrogen and the CO produced (reference SH2(2)) by the co-electrolysis of steam and of $CO_2$ and also, where appropriate, the methane produced by the methanation reaction are also recovered at gas flow sector T2 of the cells, in the fourth ports 64, 74, 84 of each interconnector 5.

Simultaneously, the oxygen $O_2$ produced S($O_2$) is recovered in the sixth ports 66, 76, 86 of the three metal plates of each interconnector 5. The circulation of draining gas and the recovery of oxygen are therefore common to all the cells, independently of the separation thereof into two as flow sectors T1, T2, at the cathodes.

FIGS. 10A and 10B show a variant of circulation of the gases on the anode 4 side, according to which the same separation into two adjoining trapezoidal gas flow sectors is carried out on the side of the oxygen electrode (anode 4). As can be seen, the trapezoidal gas flow sectors on the cathode 2 side are at 90° to those on the anode 4 side. Thus, the draining gas such as air supplies the zone 66.1, 76.1, 86.1 and independently the zone 65.2, 75.2, 85.2. In addition, the oxygen produced with, where appropriate, the draining gas, is recovered at zone 65.1, 75.1, 85.1 and independently zone 66.2, 76.2, 86.2. The circulation of the oxygen produced between the zone 66.1, 76.1, 86.1 and the zone 65.1, 75.1, 85.1 is also in counterflow between the zone 65.2, 75.2, 85.2 and the zone 66.2, 76.2, 86.2.

This thus gives a cross-current circulation of the oxygen produced relative to the hydrogen produced, with additionally a circulation of the oxygen produced in two distinct trapezoidal gas flow sectors.

The three flat metal sheets 6, 7, 8 constituting each interconnector 5 according to the invention are thin flat metal sheets, pierced and assembled with one another by welding. The thin metal sheets are preferably metal sheets less than 3 mm thick, typically with a thickness of the order of 0.2 mm. All the welds between metal sheets are produced upon manufacture and may advantageously be produced according to a transmission laser technique, which is possible due to the small thickness of the thin metal sheets, typically of the order of 0.2 mm.

All the metal sheets are advantageously made of ferritic steel with approximately 20% chromium, preferably made of CROFER® 22APU or FT18TNb, AISI 441, or based on nickel of Inconel® 600 or Haynes® type in thicknesses typically of between 0.1 and 1 mm.

Assembly by weld lines ls around the ports between flat metal sheets 6, 7, 8 guarantees good leaktightness during operation of the electrolyzer between the mixture of steam and of carbon dioxide $CO_2$ conveyed to the interconnectors 5 and distributed, and also the gases recovered in a trapezoidal gas flow sector T1 and that of the adjoining gas flow sector T2, and with the draining gas conveyed E(O2) and the oxygen S(O2) recovered. The weld lines are illustrated in FIGS. 9A to 9B.

As illustrated on all the FIGS. 7 to 10B, the three metal sheets 6, 7, 8 are pierced at their periphery by additional ports O suitable for accommodating fixing rods. These fixing rods make it possible to apply a retention force to the stack of the different components of the electrolysis reactor.

The invention is not limited to the aforementioned examples; in particular, features of the illustrated examples may be combined in variants that have not been illustrated.

Other variants and improvements may be envisaged within the context of the invention.

In particular, if the material inserted into the nickel screen 8 and into the cathode 2 in order to produce the sealing bead 10 is a glass-ceramic in the examples described in detail above, it may be any material that opposes the passage of the gases and that may be readily shaped within a porous metallic substrate of a contact element. It may especially be a solder before or after being placed within the stack.

CITED REFERENCE

[1]: Fabien Ocampo et al., "*Methanation of carbon dioxide over nickel-based Ce0.72Zr0.28O2 mixed oxide catalysts prepared by sol-gel method*", Journal of Applied Catalysis A: General 369 (2009) 90-96.

The invention claimed is:

1. A method comprising co-electrolyzing steam $H_2O$ and carbon dioxide $CO_2$, in a reactor comprising a stack of individual electrolysis cells of solid oxide type, with a rectangular or square area, each formed of a cathode comprising material configured to catalyze a methanation reaction, of an anode and of an electrolyte inserted between the cathode and the anode, a plurality of electrical and fluid interconnectors each comprising a first gas flow sector and a second gas flow sector arranged on a same side of the interconnector and each being arranged between two adjacent individual electrolysis cells of the stack of individual electrolysis cells with one face in electrical contact with the anode of one of the two adjacent individual electrolysis cells and the other face in electrical contact with the cathode of a second individual electrolysis cell of the two adjacent individual electrolysis cells, and a plurality of electrical contact and gas distribution elements, each arranged between the cathode of one of the individual electrolysis cells and one of the plurality of electrical and fluid interconnectors, wherein:

a first zone and a second zone of each of the plurality of electrical and fluid interconnectors are supplied independently with a mixture of steam $H_2O$ and of carbon dioxide $CO_2$ and the mixture is distributed to the cathode of each of the individual electrolysis cells, then a synthesis gas produced is recovered within the cathode of each of the individual electrolysis cell, in a third zone and a fourth zone of each of the plurality of electrical and fluid interconnectors in fluid communication respectively with the first zone and the second zone; each of the plurality of electrical contact and gas distribution elements integrating a sealing bead forming a gas distribution barrier separating the first gas flow sector comprising the first and third zones from the second gas flow sector comprising the second and fourth zones, the first gas flow sector and the second gas flow sector being adjoined by the gas distribution barrier, forming an area substantially equal to that of each cell; the first to fourth zones being dimensioned, and the gas circulation barrier being arranged, such that a length of the first gas flow sector in a direction perpendicular to a direction of gas flow increases or decreases between the first and third zones and a length of the second gas flow sector in a direction perpendicular to a direction of gas flow also increases or decreases between the second and fourth zones; and the first and second zones of each of the plurality of electrical and fluid interconnectors are supplied such that a gas circulation to each cathode in the first flow sector is in counterflow to a gas circulation in the second flow sector.

2. The method of claim 1, wherein the first gas flow sector and the second gas flow sector are of trapezoidal form.

3. The method of claim 2, comprising in-situ methanation, wherein supply is carried out via a largest base of the first gas flow sector and of the second gas flow sector of trapezoidal form delimited respectively by the first and the third zone, in order to minimize an in-situ methanation reaction compared to a co-electrolysis reaction of steam $H_2O$ and carbon dioxide $CO_2$ within the stack of individual electrolysis cells.

4. The method of claim 2, wherein supply is carried out via the smallest base of the first and second trapezoidal sectors delimited respectively by the first and the third zone, in order to maximize the in situ methanation reaction compared to the co-electrolysis reaction within the stack.

5. The method of claim 2, comprising in-situ methanation, wherein a length ratio between small and large bases of the first gas flow sector and of the second gas flow sector of trapezoidal form is determined beforehand in order to promote or not promote an in-situ methanation reaction compared to a co-electrolysis reaction of steam $H_2O$ and carbon dioxide $CO_2$ within the stack of individual electrolysis cells.

6. The method of claim 1, wherein a fifth zone of each electrical and fluid interconnector is supplied with draining gas, and it is distributed to the anode of each individual electrolysis cell, then the oxygen $O_2$ produced and the draining gas are recovered in a sixth zone of each interconnector, so as to have a same supply of draining gas and a same recovery of oxygen produced for the first gas flow sector and the second gas flow sector.

7. The method of claim 1, comprising in-situ methanation, wherein the co-electrolysis is carried out at least in part with steam $H_2O$ produced by in-situ methanation.

* * * * *